United States Patent [19]
Yasuhara et al.

[11] Patent Number: 5,655,870
[45] Date of Patent: Aug. 12, 1997

[54] STACKER CRANE IN A WAREHOUSE

[75] Inventors: Sakihiko Yasuhara; Gennosuke Inoue; Shunji Kishimoto, all of Tokyo; Akiya Maeda, Osaka; Katsuaki Murakami, Osaka; Katsuhisa Haruta, Osaka, all of Japan

[73] Assignees: Kawasaki Steel Corporation, Kobe; Okumura Machinery Corporation, Osaka, both of Japan

[21] Appl. No.: 505,362

[22] PCT Filed: Mar. 1, 1993

[86] PCT No.: PCT/JP93/00270

§ 371 Date: Jan. 4, 1996

§ 102(e) Date: Jan. 4, 1996

[87] PCT Pub. No.: WO94/20393

PCT Pub. Date: Sep. 15, 1994

[51] Int. Cl.$^6$ .................................................. B65G 1/04
[52] U.S. Cl. .................. 414/273; 364/478.02; 414/274; 414/277; 414/282; 414/283; 414/222; 414/908; 414/911; 242/533; 901/46
[58] Field of Search .................................. 364/360, 564, 364/478, 474.34, 474.35; 235/487, 616 M; 318/568, 16, 562.17; 242/533.8, 533; 414/908, 911, 910, 273, 274, 277, 280, 281, 282, 283, 222, 225, 659, 660, 661, 900; 395/93, 97; 901/46, 47, 1

[56] References Cited

U.S. PATENT DOCUMENTS

| | | | |
|---|---|---|---|
| 3,802,580 | 4/1974 | Castaldi | 414/274 |
| 4,669,942 | 6/1987 | Nagasawa | 414/908 X |
| 5,003,188 | 3/1991 | Igari | 414/274 X |
| 5,096,357 | 3/1992 | Galbani | 414/911 X |
| 5,192,033 | 3/1993 | Pipes | 414/911 X |
| 5,308,217 | 5/1994 | Pienta | 414/908 X |
| 5,354,976 | 10/1994 | Mäkinen et al. | 414/911 X |
| 5,362,191 | 11/1994 | Beckmann | 414/908 X |
| 5,388,955 | 2/1995 | Schröder | 414/911 X |

FOREIGN PATENT DOCUMENTS

| | | | |
|---|---|---|---|
| 48-100871 | 12/1973 | Japan . | |
| 7558 | 1/1977 | Japan | 414/908 |
| 54-11586 | 9/1979 | Japan . | |
| 61-7140 | 1/1986 | Japan . | |
| 61-41111 | 2/1986 | Japan . | |
| 244803 | 10/1987 | Japan | 414/908 |
| 63-185708 | 8/1988 | Japan . | |
| 1-110402 | 4/1989 | Japan . | |
| 1-110405 | 4/1989 | Japan . | |
| 1-122897 | 5/1989 | Japan . | |
| 3-35816 | 2/1991 | Japan . | |
| 111314 | 5/1991 | Japan | 414/274 |
| 508455 | 3/1976 | U.S.S.R. | 414/283 |

OTHER PUBLICATIONS

Modern Materials Handling—"Stacker Keeps An Eye on Boom Positioning"—pp. 42–44.

*Primary Examiner*—Frank E. Werner
*Attorney, Agent, or Firm*—Wenderoth, Lind & Ponack

[57] ABSTRACT

A fork-lift apparatus for use in a stacker crane has a running apparatus for traveling forward and backward and a carriage provided with a fork device and arranged for upward and downward movements by a lift apparatus for the purpose of carrying a load with the fork device to and from a desired rack in a multi-tier automatic warehouse. In particular, the carriage has at its lower region a swivel device, a swivel frame driven by the swivel device for rotating movement, and a ram fork provided in the swivel frame as driven by a drive device for movement.

4 Claims, 20 Drawing Sheets

Fig.19

[DESCRIPTION OF NUMERALS]

1 · · · STACKER CRANE

2 · · · TRAVELING APPARATUS

6 · · · FORK-LIFT APPARATUS

7 · · · CARRIAGE

8 · · · LIFT APPARATUS

20 · · · SWIVEL BEARING

26 · · · HORIZONTAL SWIVEL FRAME 27 a · RACK GEAR 27 b · RACK GEAR

28 · · · RAM FORK

30 · · · PINION GEAR

38a、38b · · CABLE WIRES(OR ROLLER CHAINS)

39a、39b、39c、39d、39e、39f
 · · ROTARY MEMBERS (SPROCKETS)

C1 · · · COIL(LOAD)

C2 · · · CENTER APERTURE

1A · · · INPUT TABLE

11 · · · CENTER DETECTING MEANS

111、112 · · DISTANCE SENSORS

118 · · PHOTOELECTRIC SWITCH

113 · · SCANNING MEANS

114 · · TRANSDUCER CIRCUIT

2A · · OUTPUT TABLE

4A · · STORAGE RACK

41、42 · STORAGE BLOCKS

Fig.20

- 3A ·· TRACK
- 43 ·· STORAGE ARRAY
- 5A ·· ID TAG (MEMORY MEANS)
- 6A ·· FORK-LIFT MECHANISM
- 61 ·· FORK
- 62 ·· FORK ACTUATING MEANS
- 63 ·· CARRIAGE
- 64 ·· CRANE
- 65 ·· FORK VERTICAL ACTUATING MEANS
- 66 ·· CRANE TRAVELING APPARATUS
- 67 ·· ID CONTROLLER
- 68 ·· FORK CONTROLLER
- 69 ·· VERTICAL MOVEMENT DETECTING MEANS
- 691 · DETECTION LABEL
- 692 · REFERENCE LEVEL DETECTING CIRCUIT
- 693 · TIER DETECTION MEAS
- 694 · MAGNETIC STRIPE PATTERN
- 695 · MAGNETIC SENSOR
- 696 · TRANS DUCER CIRCUIT
- 697 · COMPENSATION MOVEMENT DETECTING MEANS
- 9A ·· CONTROL APPARATUS
- 91 ·· INPUT MEANS
- 92 ·· ADDRESS MEMORY MEANS
- 93 ·· DATA INPUT/OUTPUT MEANS
- 94 ·· DATA TRANSFER MEANS

STACKER CRANE IN A WAREHOUSE

TECHNICAL FIELD

The present invention relates to a stacker crane for use in a multi-tier automatic warehouse and more particularly, to a fork-lift apparatus in a stacker crane for handling roll forms of load. It also relates to a method of controlling the fork-lift apparatus in a stacker crane for lifting and lowering various types of loads which have apertures provided in different regions thereof for accepting a fork(s) of the apparatus or provided in the center of a roll or cylinder form thereof made by rolling a length of wire or a strip of sheet and also, to a control apparatus embodying the method.

BACKGROUND ART

A common multi-tier automatic warehouse includes a stacker crane and two blocks of multi-tier racks disposed on both sides of a track along which the stacker crane travels. Each tier supports a number of loads on their pallets. For unloading a load on its pallet from the rack, the stacker crane is anchored on the track and its carriage is elevated to the rack. Then, a fork-lift apparatus on the carriage is actuated to extend its forks under the pallet. When the carriage is further elevated, the forks lift up the pallet with the load. The fork-lift apparatus is then actuated to retract the forks allowing the load on the pallet to be loaded on the carriage. After the carriage is lowered by a lifting mechanism, the stacker crane travels to unload the load.

In case that the load is of a roll form having a given outer diameter and a center aperture arranged in discrete location and size, it may not appropriately be loaded and unloaded with the use of such a conventional fork-lift apparatus in a multi-tier automatic warehouse. For smooth handling of loads, any improved fork-lift apparatus is desired. In addition, the stacker crane equipped with a conventional fork-lift apparatus is relatively large in width at the carriage and its track occupies a considerable space in the multi-tier automatic warehouse.

If a rolled good is strapped on a pallet for ease of storage (or handling) in a multi-pier automatic warehouse, its overall size including a pallet height and a fork accepting clearance is increased and requires the tiers or racks to be vertically arranged at intervals of a wider distance. This will impair the optimum use of a given interior space of the warehouse. Also, the time required for handling is increased as each rolled good has to be preliminarily strapped on its pallet, thus contributing to the rise of the working cost.

When the rolled goods are identical in the size, their center apertures into which a fork of the stacker crane is inserted are located in the same place. Accordingly, the goods may be loaded and unloaded with a conventional fork-life apparatus by repeating the same fork inserting action.

In most cases, the rolled goods are different in the location of the center aperture and stored in discrete places in the warehouse. Hence, when one of the rolled goods is required for unloading, its center aperture is viewed and identified by the operator of the stacker crane so that it can accept the fork successfully.

When the load to be handled is of a cylindrical shape having a center bore for accepting the fork of a fork-lift apparatus, it is also viewed and identified by the operator for insertion of the fork into the center bore as it is different in the size and location of the center bore from other loads stored in the warehouse.

It is thus necessary for the operator of a conventional fork-lift apparatus to view and identify the size and location of a center aperture of a desired load to be handled and manually control the fork for insertion into the center aperture of the load. This action will not contribute to the reduction of the working time during the handing of load for storage but impairing the working efficiency.

In particular, even if the center aperture of a load into which the fork of the fork-lift apparatus is inserted has been recognized at the loading to a storage space, it has to be examined again at the unloading from the same.

Also, the manual control of the fork movement by viewing may depend on skills and conditions of the operator. It is probable that excessive brightness or illusion causes the operator to lose the visual estimation of a correct distance resulting in collision of the fork against and damage to the load.

It is an object of the present invention, in view of the foregoing aspects, to provide a fork-lift apparatus in a stacker crane capable of loading and unloading loads of a rolled form smoothly on the racks or tiers of a multi-tier automatic warehouse while the width of a track on which the stacker crane travels is minimized thus contributing to the reduction of each unit storage space in the multi-tier automatic warehouse without sacrificing the storage amount.

It is another object of the present invention to provide a fork-lift apparatus in a stacker crane where the stable movement of a ram fork regardless of a fall moment is ensured as a counter force on the ram fork is lessened by dispersion.

It is a further object of the present invention to provide a fork-lift apparatus in a stacker crane, a method of controlling the fork-lift apparatus, and a control apparatus for implementing the method.

DISCLOSURE OF THE INVENTION

For achievement of the foregoing objects of the present invention, novel schemes have been developed. A stacker crane for carrying a load to and from a desired rack for storage in a multi-tier automatic warehouse has a crane running apparatus for traveling forward and backward and a carriage arranged to support a fork-lift apparatus and driven by a lift apparatus for upward and downward movements. The fork-lift apparatus is characterized in that the carriage has at its lower region a horizontal swivel means, a swivel frame mounted over the horizontal swivel means and made of an assembly of upper, lower, front, and rear members which is open to both, left and right, sides of a track of the stacker crane and has an inner space for accepting the load, a couple of rack gears mounted to the upper and lower members of the swivel frame respectively and extending lengthwisely of the swivel frame, and a ram fork mounted between the left and right ends in the swivel frame and comprising a main body extending between the upper and lower members of the swivel frame, a fork extending from a central region of the main body, and a plurality of pinion gears mounted to the upper and lower ends of the main body for meshing with both sides of the upper and lower rack gears and synchronously driven by a drive means so that the ram fork can travel throughout the swivel frame when the synchronous rotating movement of the pinion gears meshing with the rack gears is executed by the drive means and simultaneously, it can be turned together with the swivel frame in the carriage by the action of the horizontal swivel means.

A fork-lift apparatus in a stacker crane for carrying a load to and from a desired rack for storage in a multi-tier automatic warehouse, having a crane running apparatus for traveling forward and backward and a carriage arranged to support the fork-lift apparatus and driven by a lift device for upward and downward movements, is provided in that the carriage has at its lower region a horizontal swivel means, a swivel frame mounted over the horizontal swivel means and made of an assembly of upper, lower, front, and rear members which is open to both, left and right, sides of a track of the stacker crane and has an inner space for accepting the load, a rack gear mounted to the lower member of the swivel frame and extending lengthwisely of the swivel frame, and a ram fork mounted between the left and right ends in the swivel frame and comprising a main body extending between the upper and lower members of the swivel frame and a fork extending from a central region of the main body, and wires mounted over rotary members, rotatably mounted to both, front and rear, ends of the lower member and a rear end of the upper member of the swivel frame, for joining the lower of a fork side of the main body of the ram fork to the upper of a counter fork side of the same so that the ram fork can travel throughout the swivel frame when the rotating movement of pinion gears mounted to the main body of the ram fork and meshed with the rack gear on the lower member of the swivel frame is executed by a drive means and simultaneously, it can be turned together with the swivel frame in the carriage by the action of the horizontal swivel means.

Also, a fork-lift controlling apparatus, according to the present invention, for use with a system having an input table for receiving a variety of roll-formed loads which are different in size and have axially extending center apertures therein into which a fork is inserted for handling, storage racks for storage of the loads, an output table for removal of the loads, and a fork-lift mechanism for transferring the loads between the input table, the storage racks, and the output table, is characterized by a center detecting means for measuring the location of the center aperture of each load placed on the input table, a memory means for storage of the location of the center aperture of the load, a read/write means for reading and writing the location of the center aperture of the load on the memory means, and a fork controlling means for controlling the movement of the fork in accordance with the location of the center aperture of the load so that the fork is correctly inserted into the center aperture of the load.

The center detecting means may comprise a couple of distance sensors provided to sandwich the load for measuring a distance to the periphery of the load, a traveling means for moving the distance sensors about the cross section of the load, and a transducer means for calculating the location of the center aperture of the load from signal outputs of the distance sensors and movements of the same.

Also, the center detecting means may comprise a photoelectric switch mounted on the fork for detecting the present and absence of reflected light from front, a traveling means for moving the fork in a direction parallel to the diameter of the load, and a transducer means for calculating the location of the center aperture of the load from a signal output and a movement of the photoelectric switch.

In action for operating the stacker crane along a track placed in a multi-pier automatic warehouse, the crane running apparatus is actuated to run the stacker crane and simultaneously, the lift apparatus is driven to lift (or lower) the carriage. After the carriage comes to a target rack, the running and lifting movements are ceased. Then, when a plurality of pinion gears on the ram fork are synchronously rotated by the drive means, the ram fork starts moving. More particularly, the rotating movement of the pinion gears along two, upper and lower, rack gears provided in the swivel frame causes the ram fork to move (forward) in the swivel frame towards the rack on which a load to be unloaded is stored. Upon a fork of the ram fork reaching at a given location after moving into the center aperture of a roll form of the load on the rack, the forward movement of the ram fork is stopped. The lift apparatus is actuated again to lift up the carriage briefly, thus allowing the fork to hold the rolled load above the rack. Then, the ram fork is moved (backward) into the swivel frame by the action of the drive means. Accordingly, the rolled load on the ram fork is received in the swivel frame.

For carrying out the rolled load held in the carriage from the warehouse, both the crane running apparatus and the lift apparatuses of the stacker crane are driven at a time so that the stacker crane runs to its home location while the carriage holding the roller load with its ram fork lowers down to the lowermost location on the stacker crane. At the home location of the stacker crane, the ram fork is moved (forward) to an transfer cart or table. Then, the carriage is lowered to place the rolled load on the transfer cart or table. After the placement of the rolled load, the ram fork is moved (backward) to remain in the swivel frame. The stacker crane stays at the home location until another command is given.

For handling with the action of the ram fork a load placed on a rack of the opposite side of the track of the stacker crane, the swivel frame is turned 180 degrees by the action of the horizontal swivel means so that the front end of the fork of the ram fork comes to face the rack of the opposite side. The ram fork is then moved (forward) to the load on the opposite rack by the drive means. When the fork of the ram fork has reached at a given location over the opposite rack, the forward movement of the ram fork is ceased. The lift apparatus is actuated for causing the fork to hold up the load of a roll form. When the ram fork is moved (backward), the load on the fork is received in the swivel frame. As understood, the turning movement of the swivel frame allows the ram fork to face in a desired direction in the carriage.

Also, the lower of the fork side and the upper of the counter fork side of the ram fork are connected to each other by the wires which extend over the rotary members rotatably mounted to the given locations of the swivel frame and a stress exerted on the ram fork upon holding the rolled load will thus be offset appropriately.

In the control method of the present invention, the location of the aperture of each load to be handled is measured, recorded, and used for controlling the forward movement of the fork, whereby the insertion of the fork into the aperture of the load will be executed without error.

The control apparatus according to the present invention allows the location of the aperture of each load to be recorded into the memory means, retrieved from the same by the retrieving means when requested, and transmitted to the fork controlling means for controlling the movement of the fork so that the fork is correctly accepted in the aperture of the load.

In action of the fork-lift apparatus which includes the input table for receiving a variety of cylindrical loads which are different in the overall size and the diameter of the axially extending center aperture provided therein, storage racks for storage of the loads, an output table for removal of the loads stored on the racks, and a fork-lift mechanism for carrying the loads between the input table, the storage racks, and the output table, a load placed on the input table is first subjected to measurement of the location of its center aperture with the center detecting means and handled with the fork which is driven by the fork controlling means according to the location of the center aperture. As the load is held by the fork inserting into its aperture, it is transferred to a desired one of the storage racks for storage.

For transferring the load from the storage rack to the output table, the location of its center aperture is retrieved from the memory means by the action of the retrieving means and used for controlling the movement of the fork. As the result, the load is readily picked up by correct insertion of the fork into its center aperture before transferred to the output table.

In case of the two distance sensors are provided for measuring their distance from the periphery of a load to be examined through their scanning movement, the location of the center aperture of the load is obtained by calculation of signal outputs of the two distance sensors together with the movement of the same in the transducer means.

When the photoelectric switch for detecting the presence and absence of reflected light from front is provided, its movement parallel to the diameter of the load with the fork is measured and fed to the transducer means where it is used for calculating the location of the center aperture of the load together with a signal output of the photoelectric switch.

As the location of the aperture center of each load (for example, a difference in height between the input table and the aperture) has been measured at the receipt step of handling and recorded in the memory means as a compensation data, it can readily be retrieved and used for controlling the fork movement at any unloading step of the handling. The aperture of the load is quickly perceived through compensating operation with the compensation data without measuring again the location of the aperture of the load.

As the handling is automatically carried out according to the location data retrieved from the memory means, any collision of the fork with the load will be prevented without using visual measurement or control.

If the aperture is located at the center of a cylindrical load, it can simply be identified by measuring the periphery of the load with the distance sensors and photo-electric switch.

BRIEF DESCRIPTION OF THE DRAWINGS

FIGS. 19 and 20 relate to elements in the drawings.

BEST MODE FOR EMBODYING THE PRESENT INVENTION

First Embodiment

Figure 1:
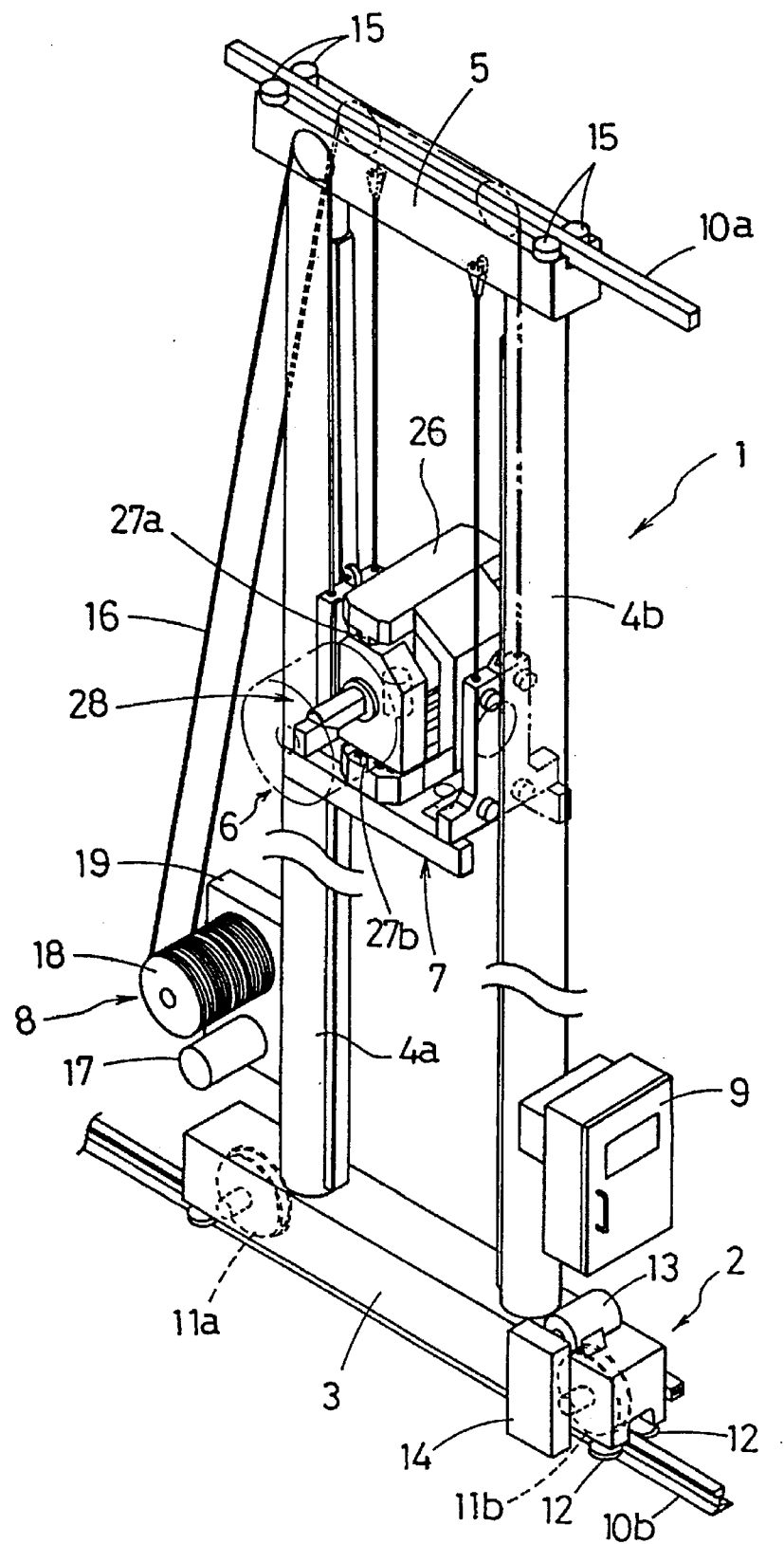
FIG. 1 is a perspective view of a stacker crane showing one embodiment of the present invention.
Figure 2:
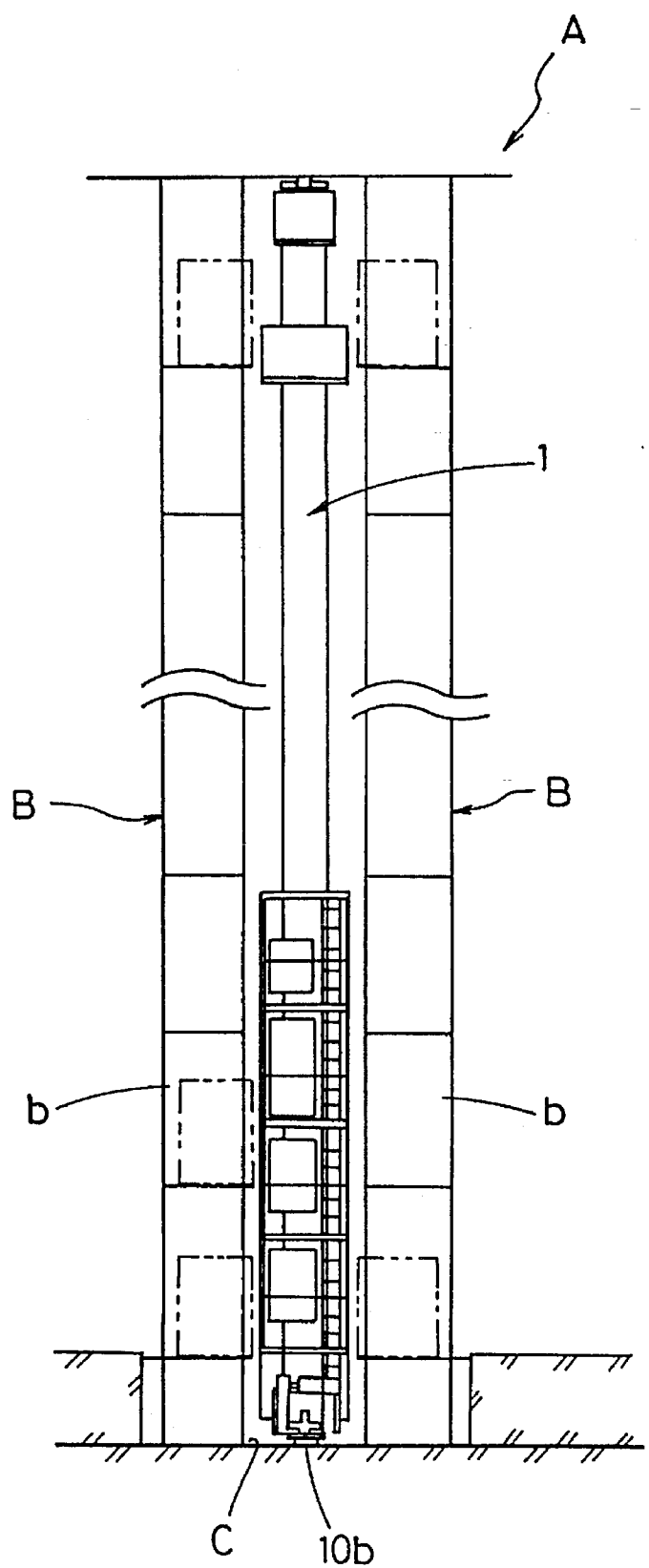
FIG. 2 is a schematic front view of the stacker crane in a multi-pier automatic warehouse viewed from its track side.
Figure 3:
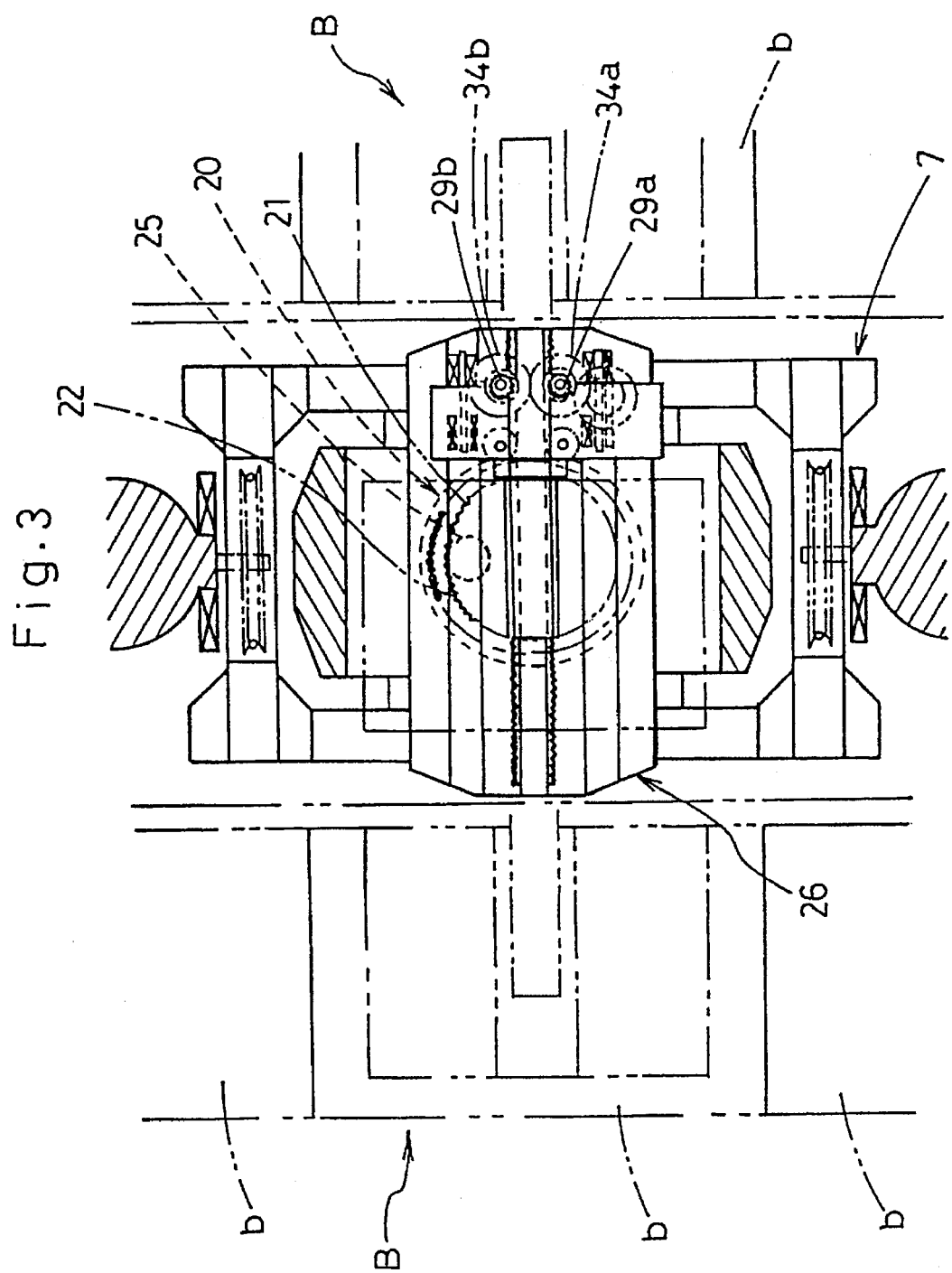
FIG. 3 is a cross sectional explanatory view of a primary part of a fork-lift apparatus according to the present invention.
Figure 4:
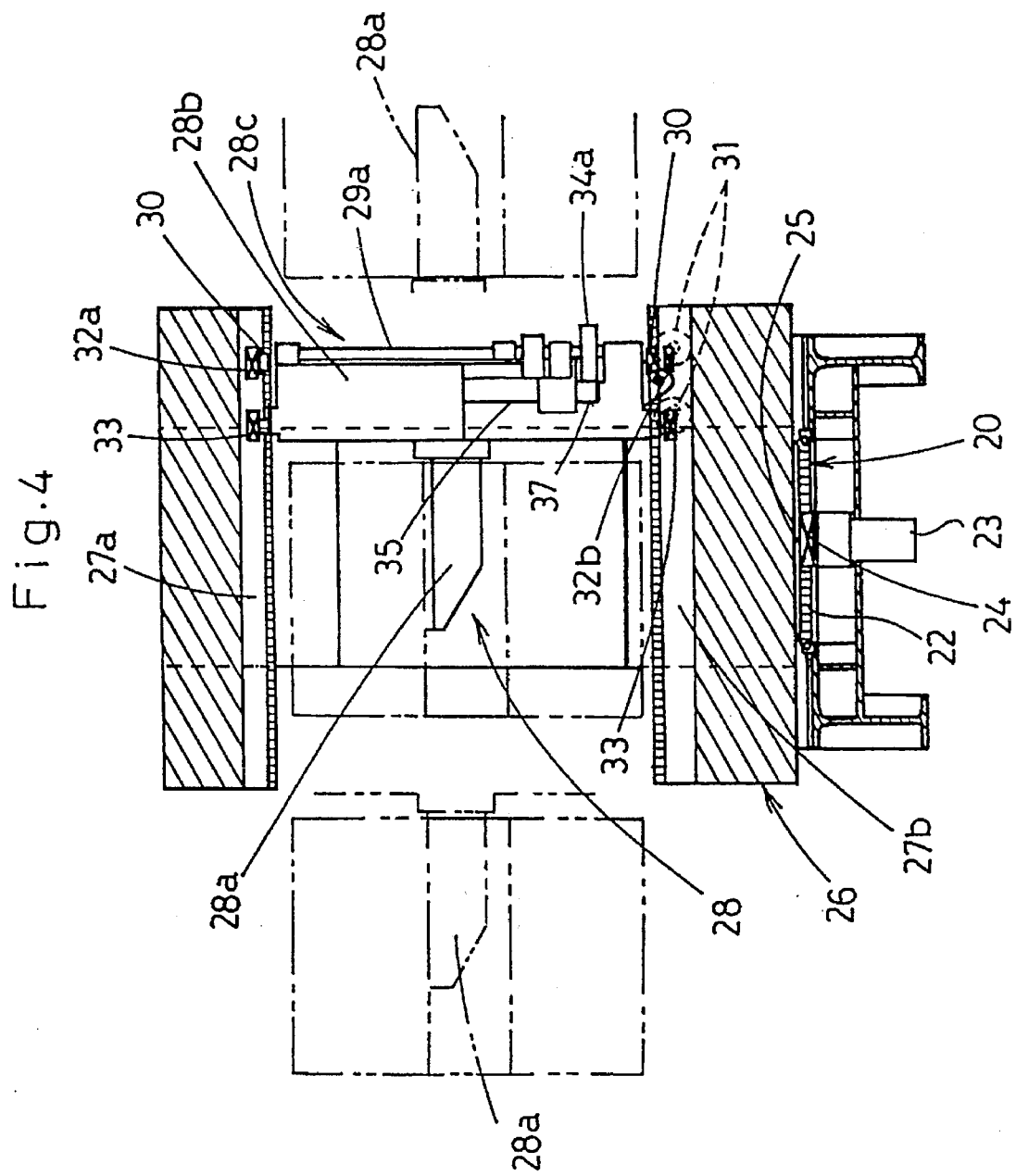
FIG. 4 is a longitudinal cross sectional explanatory view of the primary part of the fork-lift apparatus according to the present invention.
Figure 5:
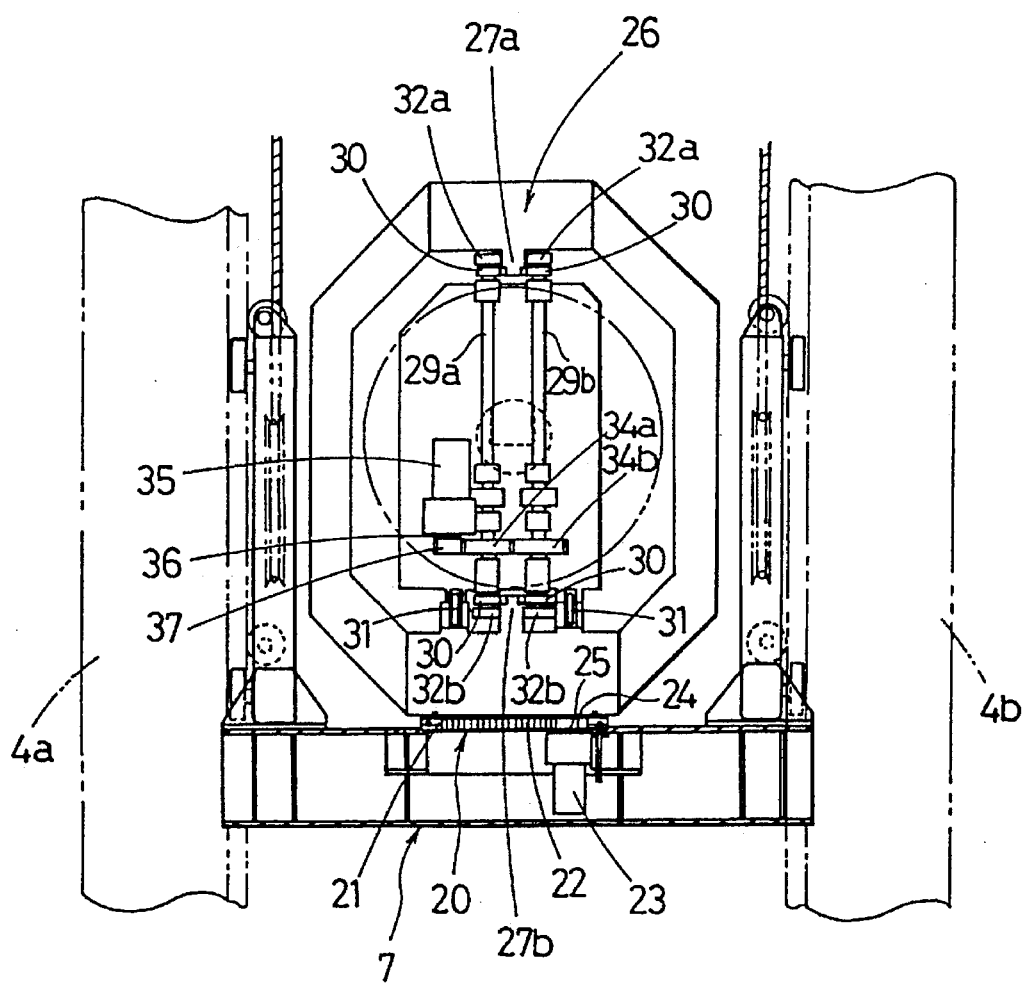
FIG. 5 is a side view of the same shown in FIG. 4.
Figure 6:
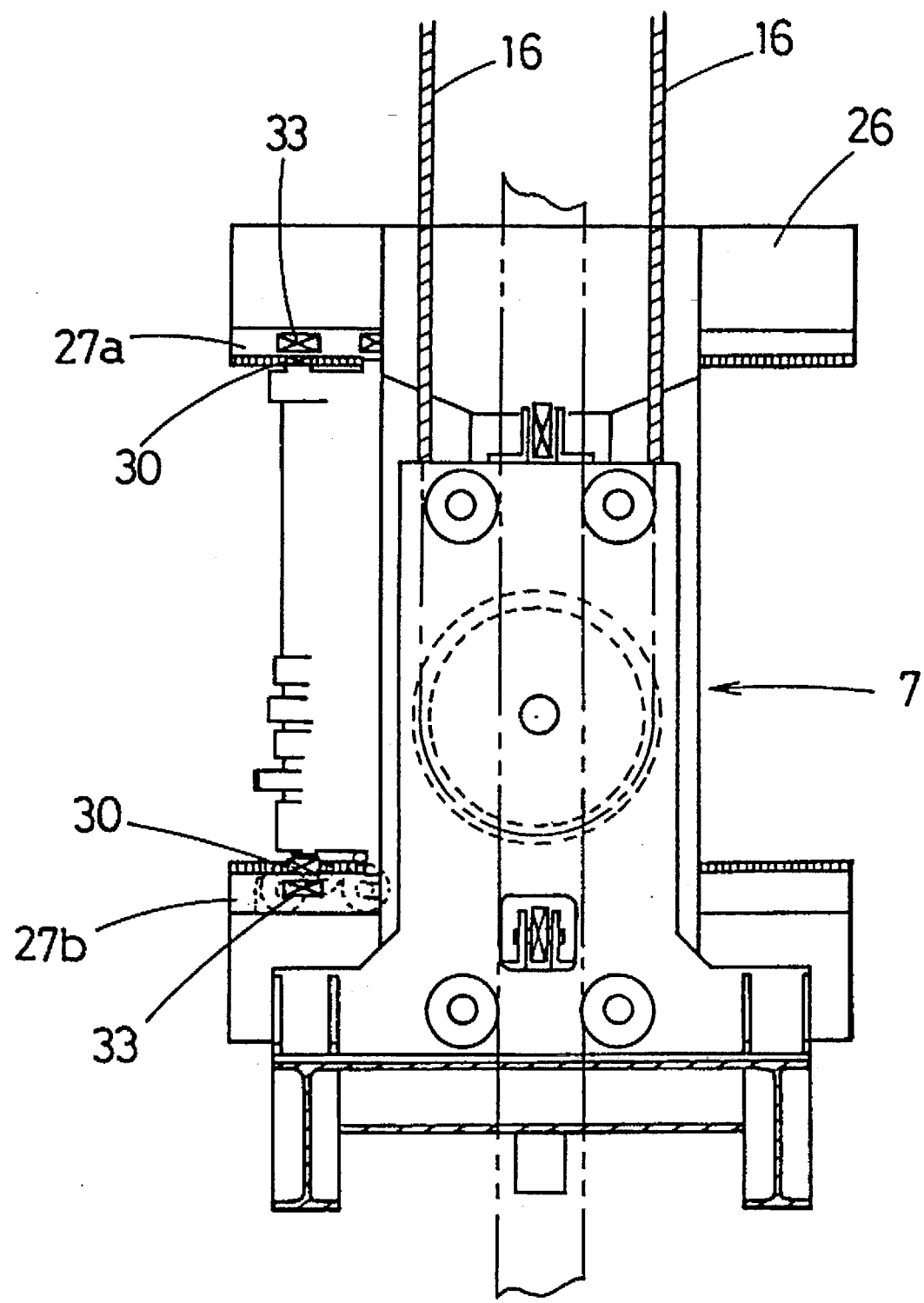
FIG. 6 is a side view of the same shown in FIG. 5.

A first embodiment of the present invention will be described referring to FIGS. 1 to 6.

A stacker crane according to the first embodiment of the present invention is denoted by 1 and comprises a lower saddle 3 provided with a crane traveling unit 2, two posts 4a and 4b mounted vertically on two, front and rear, near ends of the lower saddle 3, an upper saddle 5 mounted to the top of the posts 4a and 4b, a carriage 7 to which a fork-lift apparatus 6 is mounted, a lift drive unit 8 for lifting and lowering the carriage 7, a control/power panel 9, and other minor components. The stacker crane 1 is disposed between two groups B,B of multiple tiers or racks in a multi-tier automatic warehouse A.

Also, provided between the two rack groups B,B is a stacker crane traveling track C which comprises an upper rail 10a and a lower rail 10b arranged opposite to each other vertically. Two wheels 11a, 11b and four lower guide rollers 12 are rotatably mounted on the lower saddle 3 of the stacker crane 1 so that they travel along as engage with the lower rail 10b. The wheel 11b is joined to the crane traveling unit 2 which includes a driving motor 13 and a reduction deride 14. As the wheel 11b is driven by the traveling unit 2, the wheels 11a and 11b run on the lower rail 10b.

The upper saddle 5 has four upper guide rollers 15 rotatably mounted thereon so as to sandwich the upper rail 10a. The four upper guide rollers 15 allow the stacker crane 1 to be supported at the upper by the upper rail 10a.

The carriage 7 is disposed between the two posts 4a and 4b and suspended by wires 16 connected to the lift drive unit 8. The lift drive unit 8 comprises a lift drive motor 17, a lift drum 18, and a reduction device 19. As the wires 16 are rewound on and released from the lift drum 18, the carriage 7 moves upward and downward.

The fork-lift apparatus 6 of the first embodiment of the present invention is mounted on the carriage 7 as having the following arrangement and function. More specifically, the carriage 7 has a swivel bearing 20 mounted to a lower inside thereo as a part of the horizontal swivel means. The swivel bearing 20 has a toothed surface 22 threaded on a movable inner ring 21 thereof. The toothed surface 22 is meshed with a pinion gear 25 mounted on a rotary shaft 24 of a swivel drive motor 23. Accordingly, the inner ring 21 can rotate when the pinion gear 25 is driven by the swivel drive motor 23.

A swivel frame 26 is mounted to the swivel bearing 20 so as to rotate together with the inner ring 21. The swivel frame 26 has a shape formed of assembling upper, lower, front, and rear members and opened to both, left and right, sides of the track of the stacker crane as having an inner space therein. Two, upper and lower, rack gears 27a and 27b are mounted on the inner wall of the swivel frame 26 so that they are opposite to each other at the center. The upper and lower rack gears 27a, 27b are engaged with a fallen T-shaped ram fork 28 which can thus move horizontally.

More particularly, the ram fork 28 comprises a main body 28b, a fork 28a extending horizontally from the main body 28b, and four small wheels 31 rotatably mounted to the lower of the main body 28b for movement along the inner surface of the swivel frame 26. The ram fork 28 also has a back 28c thereof to which two rotary shafts 29a and 29b are vertically mounted for rotating movements. The two rotary shafts 29a and 29b extend to a length which is slightly greater than the distance between the two rack gears 27a and 27b and have pinion gears 30 mounted to both the upper and lower ends thereof for mesh with the rack gears 27a and 27b.

Also, side rollers 32a and 32b are rotatably mounted to both the upper and lower ends of the rotary shafts 29a and 29b. While the ram fork 28 has side rollers 33 mounted to both the upper and lower ends thereof, it can travel with the side rollers 32a, 32b, and 33 rotating along both sides of the rack gears 27a and 27b. The ram fork 28 is supported by four of the pinion gears 30, four of the small wheels 31, and eight of the side guide rollers 32a, 32b, 33 so that it travels horizontally throughout the swivel frame 26. The overall length of the ram fork 28 is adjusted so that it can be accommodated between the left and right ends in the swivel frame 26.

The rotary shafts 29a and 29b have toothed wheels 34a and 34b fitted thereon respectively. The toothed wheel 34a of the rotary shaft 29a is meshed with a toothed wheel 37 fitted on a rotary shaft 36 of a fork drive motor 35 which is mounted to the back 28c of the ram fork 28. When the fork drive motor 35 drives its toothed wheel 37, the two toothed wheels 34a and 34b are driven thus rotating their respective rotary shafts 29a and 29b in synchronous relationship.

An action of unloading a rolled load from a rack b by operating the stacker crane 2 provided with the prescribed fork-lift apparatus 6 in the multi-tier automatic warehouse will now be explained.

First, the stacker crane 1 is moved from its home position or any position on the track in a desired direction by actuating the traveling unit 2 in response to a command signal. Simultaneously, the carriage 7 is lifted up (or lowered down) by the action of the lift drive unit 8 and stopped when it comes to the rack b of the rack group B.

Then, the fork drive motor 35 on the ram fork 28 is actuated to drive the toothed wheels 37, 34a, and 34b for synchronous rotation of the rotary shafts 29a and 29b. As the two rotary shafts 29a and 29b rotate, their pinion gears 30 fitted to near the upper and lower ends run directly on both the rack gears 27a, 27b mounted to the upper and lower inner walls of the swivel frame 26. Accordingly, the ram fork 28 travels in the swivel frame 26 moving (or advancing) its fork 28a to the target rack b. When its fork 28a has moved into the center aperture of the rolled load located on the rack b and reached at a predetermined point, the ram fork 28 stops its (advancing) movement.

This is followed by brief lifting of the carriage 7 with the action of the lift drive unit 8 to hold with the fork 28a the rolled load above the rack b. When the fork drive motor 35 on the ram fork 28 is driven in a reverse direction to rotate the two rotary shafts 29a and 29b backward, the ram fork 28 with its fork 28a holding the rolled load moves backward (or retracts). As the result, the rolled load on the ram fork 28 is received and accommodated in the swivel frame 26.

The rolled load held in the swivel frame 26 of the carriage 7 is then carried out from the warehouse. More particularly, the stacker crane 1 is traveled to the home position while the carriage 7 being lowered to the lowermost place on the stacker crane 1 by the actions of the traveling unit 2 and the lift drive unit 8 respectively. At the home position, the ram fork 28 is moved (or advanced) to a transfer carrier or table (not shown) and the carriage 7 is lowered down to place the rolled load on the transfer carrier or table. The ram fork 28 without the rolled load is then moved backward (or retracted) to remain in the swivel frame 26 of the carriage 7. The stacker crane 1 stays at the home position until another command signal is given.

For transferring of a rolled load from a rack b to another rack b located on the opposite side of the stacker crane track by operating the stacker crane 1, the procedure starts with allowing the ram fork 28 to load the rolled load into the swivel frame 26 of the carriage 7.

The swivel drive motor 23 is then driven to rotate the pinion gear 25 and thus the inner ring 21 of the swivel bearing 20. As the inner ring 21 rotates, the swivel frame 26 is turned to 180 degrees. This action causes the ram fork 28 in the carriage 7 to turn 180 degrees so that its fork 28a is directed with the front end facing the target rack b.

This action is followed by synchronous rotation of the two rotary shafts 29a and 29b with the driving means of the ram fork 28. As its pinion gears 30 rotate along the rack gears 27a and 27b, the ram fork 28 holding the rolled load moves (or advances) towards the target rack b. Upon its fork 28a reaching a desired position on the rack b, the ram fork 28 stops its (advancing) movement. The lift drive unit 8 is then actuated to lower the carriage 7 briefly. After the rolled load is placed on the desired position of the rack b, the ram fork 28 is moved backward (or retracted) to remain in the swivel frame 26 of the carriage 7. The stacker crane 1 then stands by until another command signal is given.

The traveling, lifting, and lowering of the stacker crane 1 and the forward, backward, and rotating actions in the swivel frame of the ram fork 28 are not limited to the above mentioned controlled movements but other modifications and changes will be possible.

Second Embodiment

A second embodiment of the present invention will be described referring to FIGS. 7 to 10. Like components will be denoted by like numerals as those in the first embodiment for simplicity.

As shown, a fork-lift apparatus 6 according to the second embodiment of the present invention is mounted on a carriage 7. More specifically, the fork-lift apparatus 6 has the following arrangement and function. The carriage 7 has a swivel bearing 20 mounted to a lower inside thereof as a part of a horizontal swivel device. The swivel bearing 20 has a toothed surface 22 threaded on the circumferential edge of a rotatable inner ring 21 thereof and a pinion gear 25 mounted on a rotary shaft 24 of a swivel drive motor 23. Accordingly, the inner ring 21 can rotate when the pinion gear 25 is driven by the swivel drive motor 23.

A swivel frame 26 is mounted to the swivel bearing 20 so as to rotate together with the inner ring 21. The swivel frame 26 is formed of an assembly of upper, lower, front, and rear members having two openings opened to both, left and right, sides of the track of the stacker crane and having an inner space. For moving the ram fork 28 in horizontal directions lengthwisely of the swivel frame 26, a traveling device which comprises small wheels 31, side rollers 33, a pinion gear 37a, a drive gear 37b, and a fork drive motor 35 is disposed in the swivel frame 26 together with two guide rails 27a and 27b and a rack gear 34 along which the ram fork 28 travels.

The guide rails 27a and 27b are mounted on both, upper and lower, inner walls of the swivel frame 26 to extend between the left and right sides lengthwisely of the swivel frame 26. The ram fork 28 having a fallen T shape is arranged to run horizontally along the two, upper and lower, guide rails 27a, 27b.

The ram fork 28 comprises a main body 28b and a fork 28a extending horizontally from the main body 28b. Four of the small wheels 31 are rotatably mounted to the lower end of the main body 28b for movement along the inner surface of the swivel frame 26. Also, the side rollers 33 are rotatably mounted to the upper and lower end of the ram fork 28 for running directly along both sides of the guide rails 27a and 27b as the ram fork 28 travels. As understood, the ram fork 28 is supported by the small wheels 31 and the side rollers 33 for horizontal movement throughout the swivel frame 26.

The rack gear 34 is lengthwisely mounted on the center of the lower guide rail 27b for mesh with the pinion gear 37a mounted on a lower center of the ram fork 28. The pinion gear 37a is also meshed with the drive gear 37b which is mounted above the pinion gear 37a. The drive gear 37b is connected to the fork drive motor 35 mounted on the ram fork 28.

Figure 7:
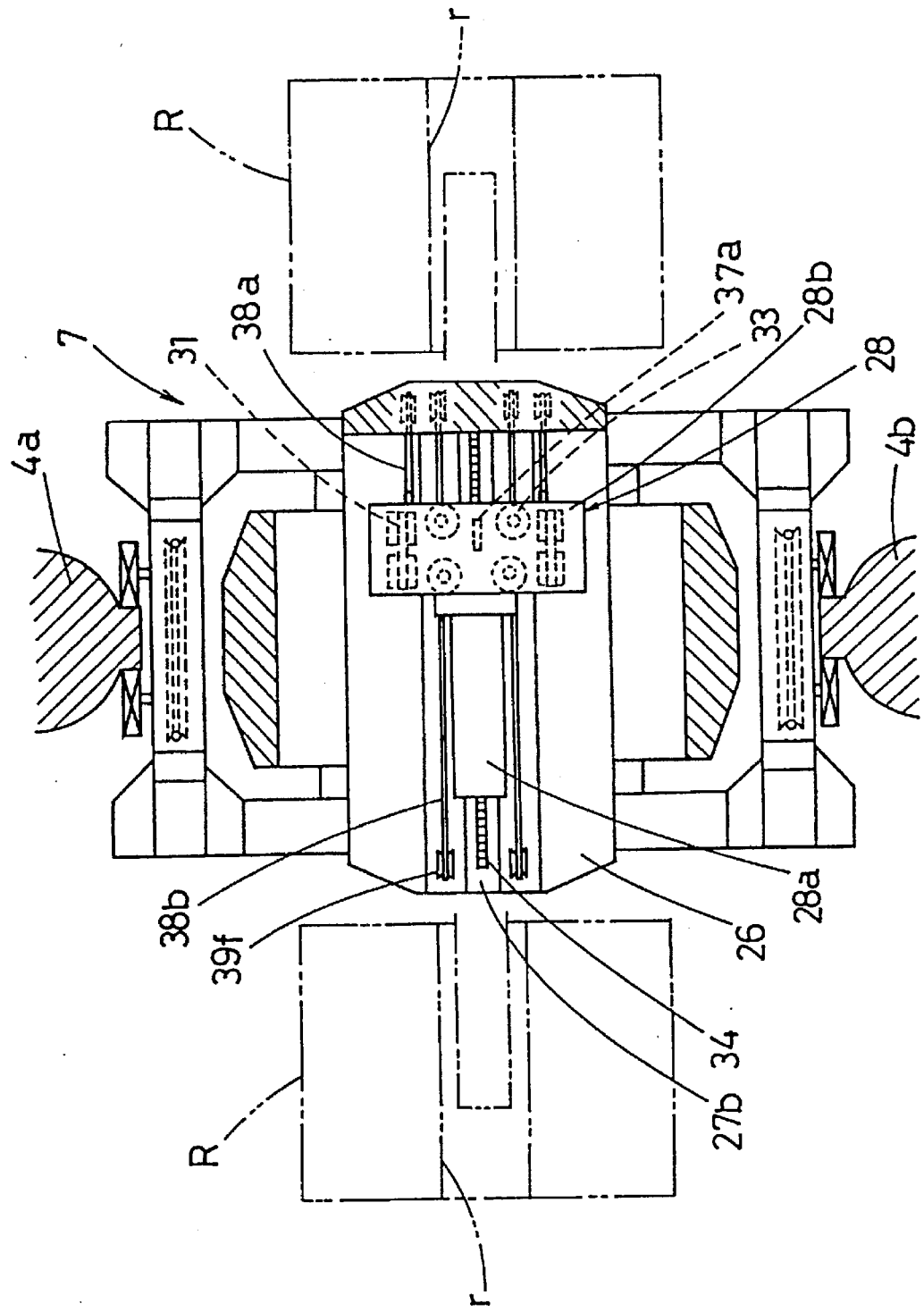
FIG. 7 is a cross sectional explanatory view of a primary part of a fork-lift apparatus showing a second embodiment of the present invention.
Figure 8:
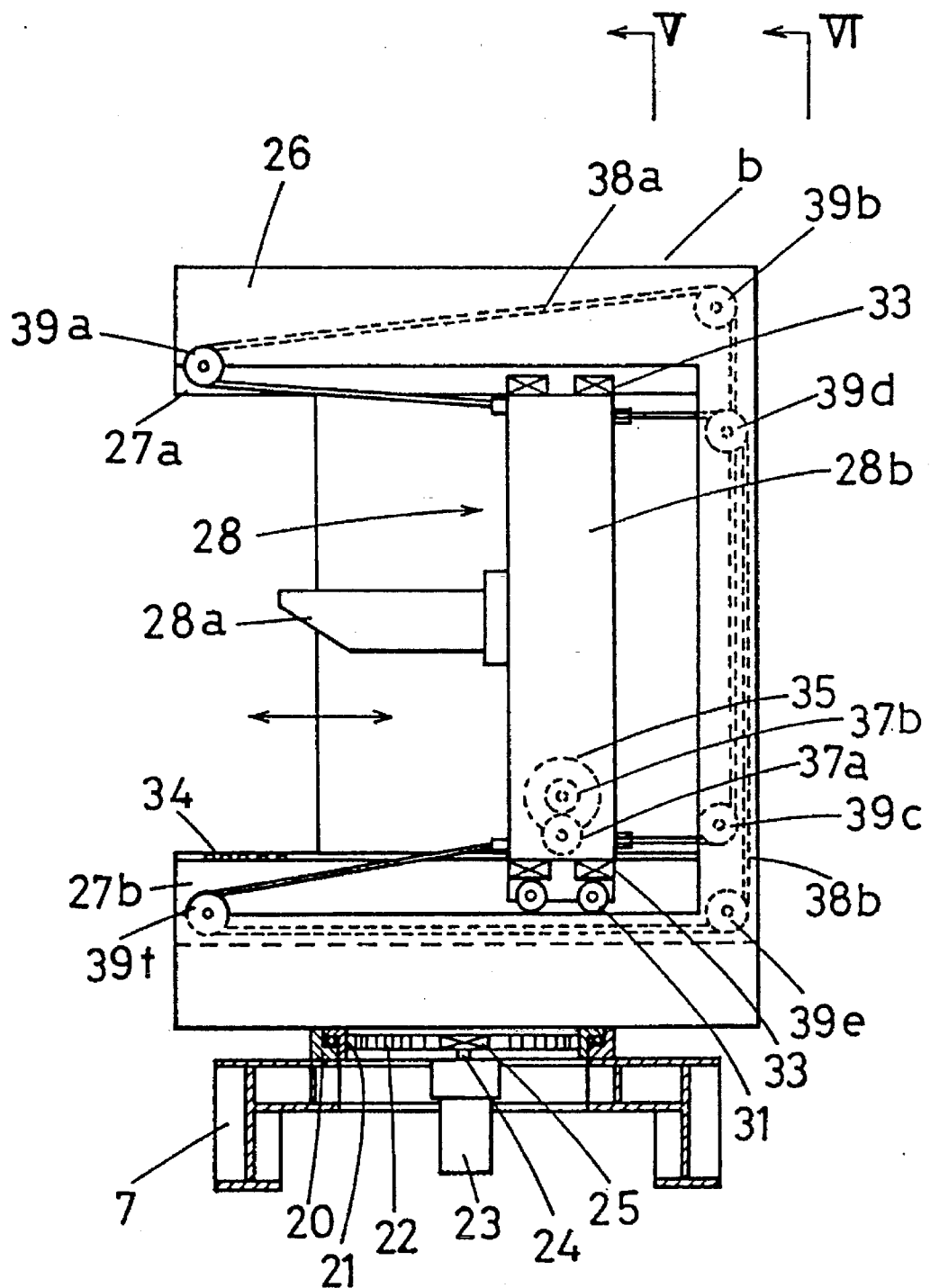
FIG. 8 is a longitudinal cross sectional explanatory view of the primary part of the fork-lift apparatus of the second embodiment.
Figure 9:
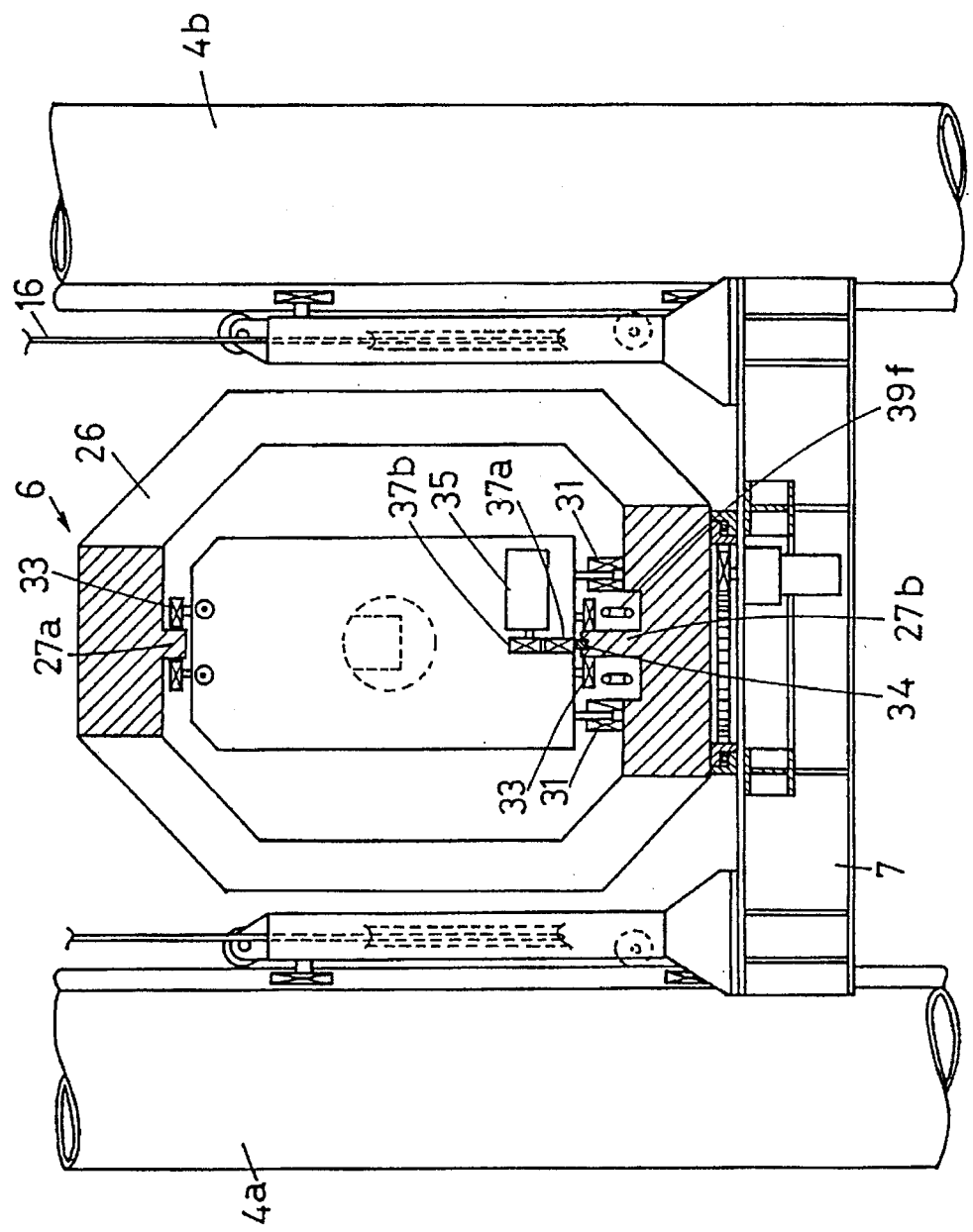
FIG. 9 is a cross sectional side view of the same taken from the arrow V of FIG. 8.
Figure 10:
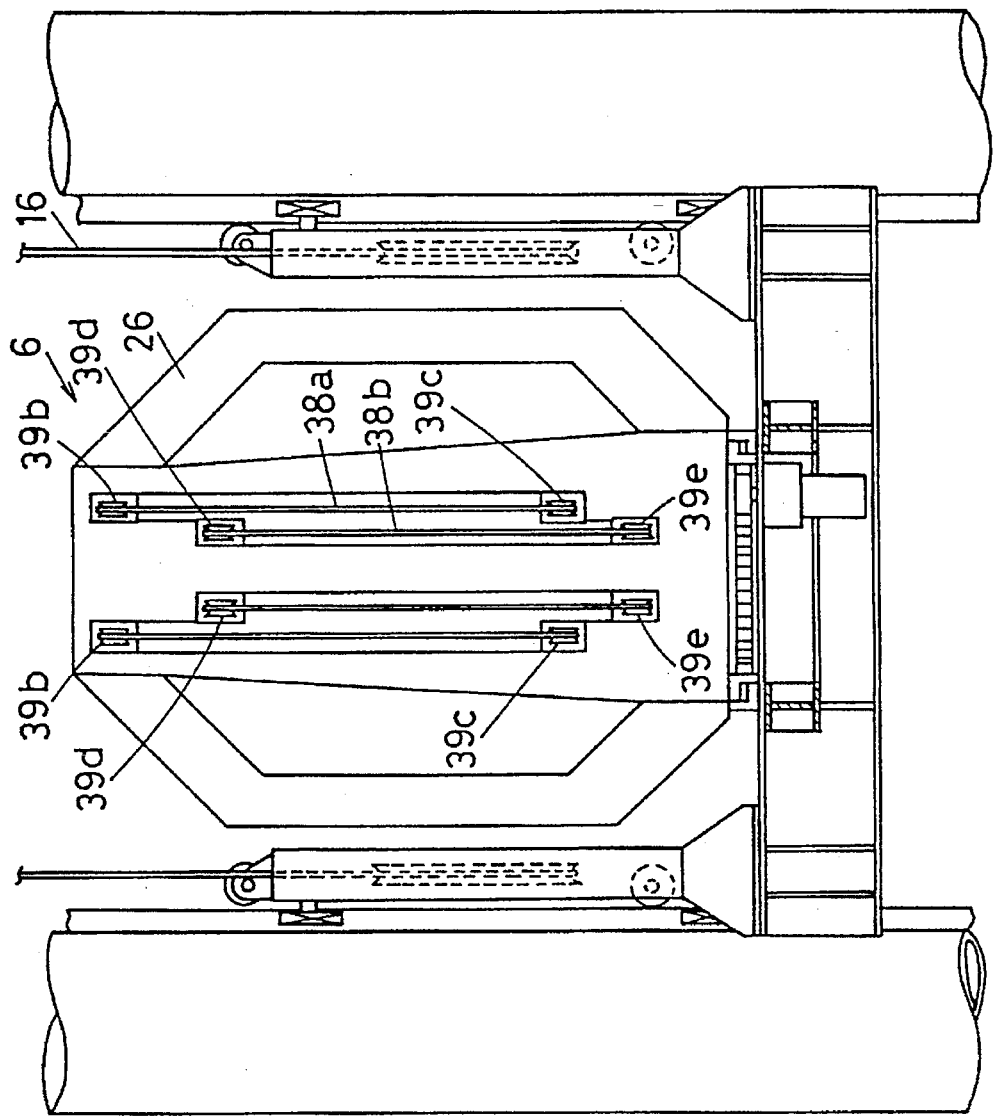
FIG. 10 is a cross sectional side view of the same taken from the arrow VI of FIG. 8.
Figure 11:
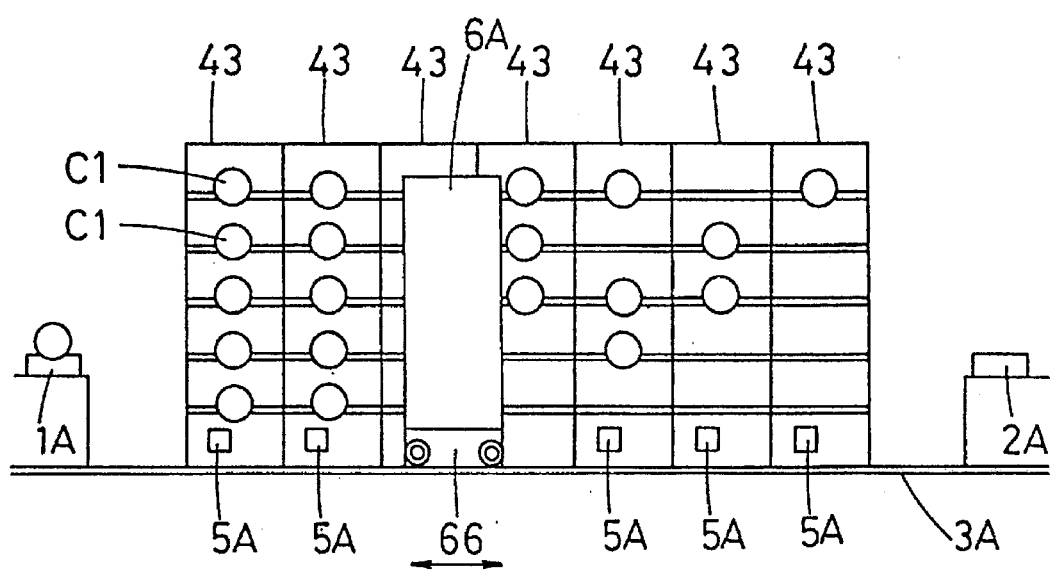
FIG. 11 is a side view of a loading and unloading system provided with a control apparatus implementing a control method of the present invention.
Figure 12:
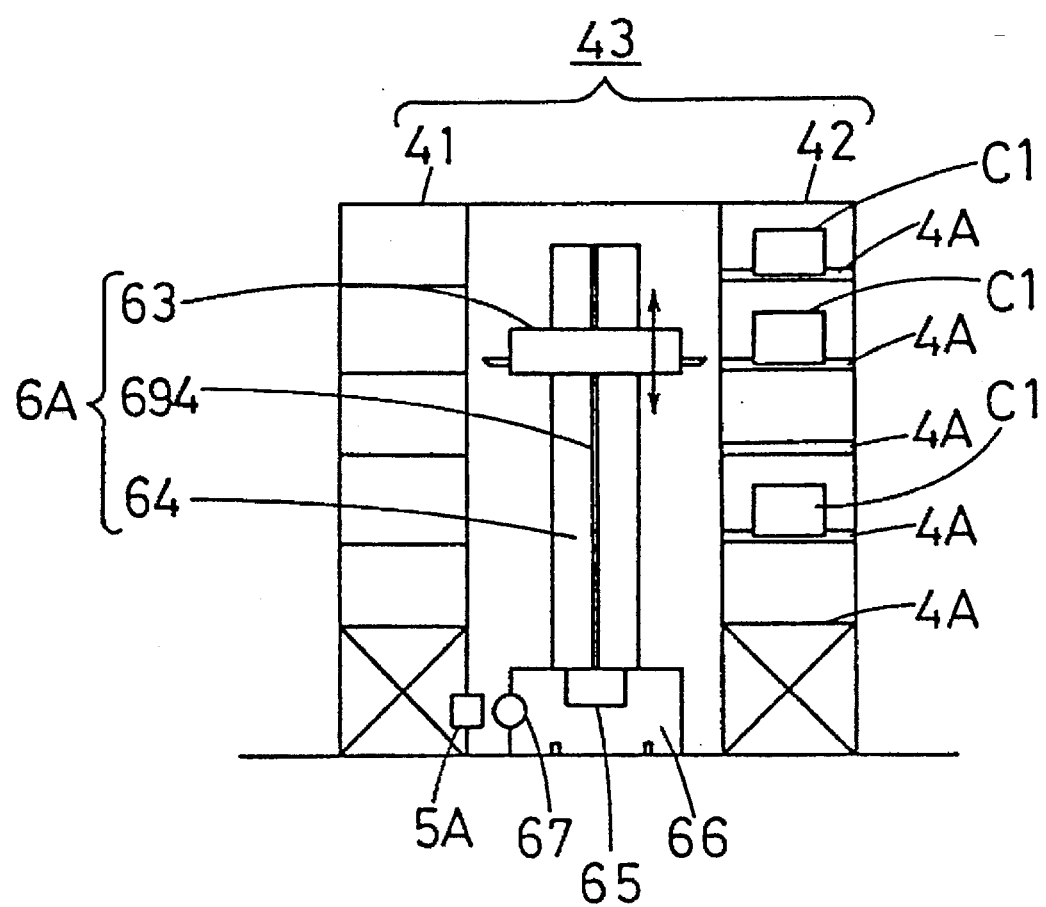
FIG. 12 is a cross sectional view of the loading and unloading system.
Figure 13:
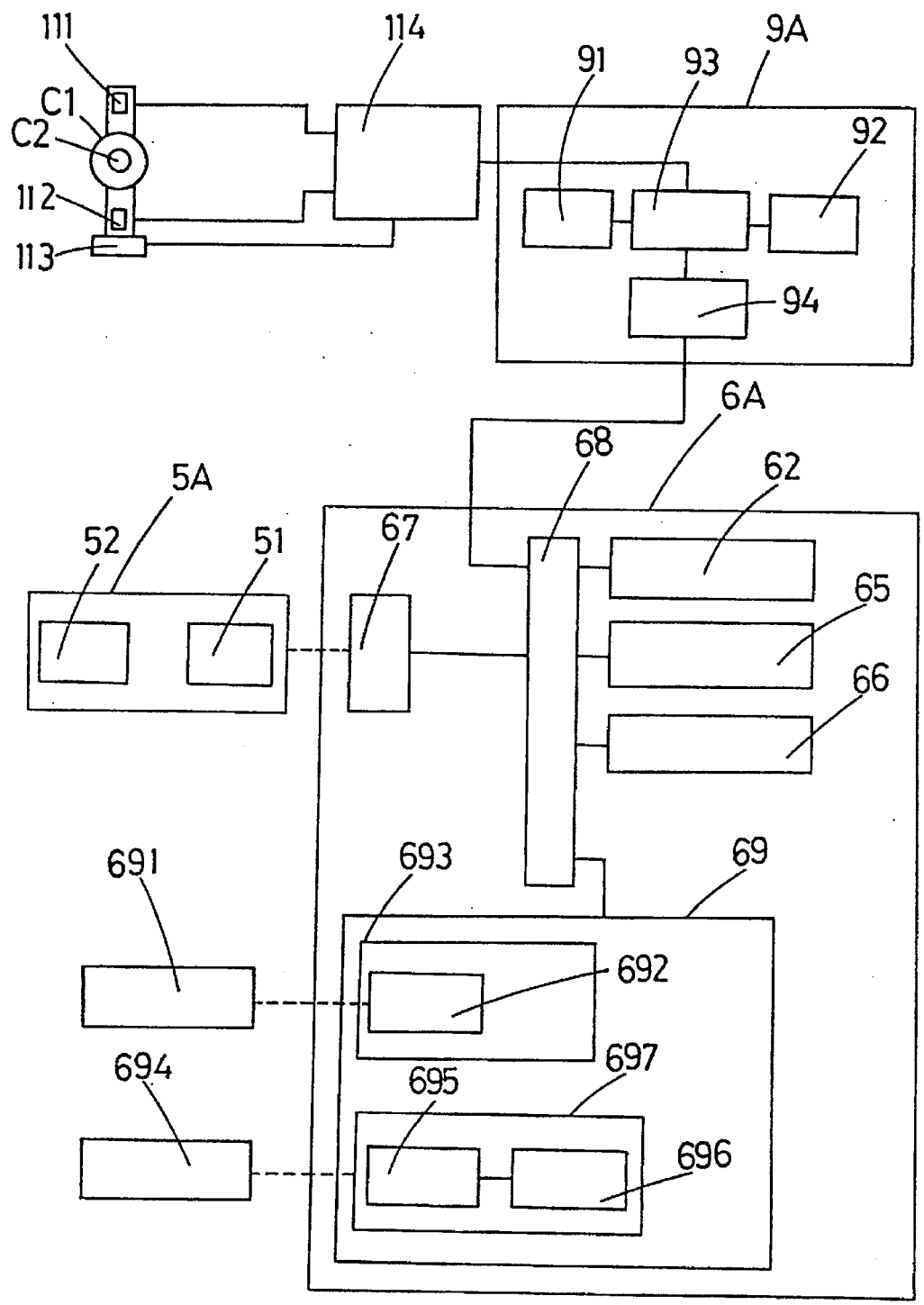
FIG. 13 is a block diagram showing a sequence of control steps of the loading and unloading system.

The ram fork 28 is supported by two sets of cable wires or roller chains 38a and 38b for movement throughout the swivel frame 26. More particularly, as shown in FIGS. 7 to 9, the swivel frame 26 has a plurality of sprockets 39a, 39b, 39c, 39d, 39e, and 39f rotatably mounted thereto so as to be located at both front and rear ends of the ram fork 28. For ease of the description, one set of the roller chains 38a and 38b at one side will be explained for tightening over the sprockets. The tightening of two sets of the roller chains 38a and 38b is identical.

The roller chain 38a is fixedly joined at one end to the upper front of the main body 28b of the ram fork 28. The other end of the roller chain 38a extends over the sprockets 39a and 39b pivoted on the front and rear ends of an upper region of the swivel frame 26 and the sprockets 39c pivoted on the rear end of a lower region of the same and is fixedly joined to the lower rear of the main body 28b of the ram fork 28.

Similarly, one end of the roller chain 38b is fixedly joined to the upper rear of the main body 28b of the ram fork 28. The other end of the roller chain 38b extends over the sprocket 39d pivoted on the upper rear of the swivel frame 26 and the sprockets 39e and 39f pivoted on the front and rear ends of a lower region of the swivel frame 26 and is fixedly joined to the lower front of the main body 28b of the ram fork 28.

An action of unloading a rolled load from a rack b by operating the stacker crane 2 provided with the prescribed fork-lift apparatus 6 in the multi-tier automatic warehouse will now be explained.

First, the stacker crane 1 is moved from its home position or any position on the track in a desired direction by actuating the crane traveling unit 2 in response to a command signal. Simultaneously, the carriage 7 is lifted up (or lowered down) by the action of the lift drive unit 8 and stopped when it comes to the rack b of the rack group B.

Then, the fork drive motor 35 on the ram fork 28 is actuated to drive via the drive gear 37b the pinion gear 37a. As the pinion gear 37a runs directly on the rack gear 34 of the lower guide rail 27b on the swivel frame 26, the ram fork 28 travels in the swivel frame 26 until its fork 28a is moved (or advanced) to the target rack b. When the fork 28a has moved into the center aperture r of the rolled load R located on the rack b and reached at a predetermined point, the ram fork 28 stops its (advancing) movement.

This is followed by brief lifting of the carriage 7 with the action of the lift drive unit 8 to hold with the fork 28a the rolled load above the rack b. When the fork drive motor 35 on the ram fork 28 is driven in a reverse direction to rotate the drive gear 37b and the pinion gear 37a backward, the ram fork 28 with its fork 28a holding the rolled load R moves backward (or retracts). As the result, the rolled load R on the ram fork 28 is received and accommodated in the swivel frame 26.

While the ram fork 28 performs a series of the handling actions, it remains supported by the roller chains 38a and 38b. When the ram fork 29 is loaded with the rolled load R, it is prevented from tilting to the fork 28a side as securely held with the roller chains 38a and 39b.

The rolled load R held in the swivel frame 26 of the carriage 7 is then carried out from the warehouse. More particularly, the stacker crane 1 is traveled to the home position while the carriage 7 being lowered to the lowermost place on the stacker crane 1 by the actions of the crane traveling unit 2 and the lift drive unit 8 respectively. At the home position, the ram fork 28 is moved (or advanced) to a transfer carrier or table (not shown) and the carriage 7 is lowered down to place the rolled load R on the transfer carrier or table. The ram fork 28 without the rolled load is then moved backward (or retracted) to remain in the swivel frame 26 of the carriage 7. The stacker crane 1 stays at the home position until another command signal is given.

For transferring of a rolled load from a rack b to another rack b located on the opposite side of the stacker crane track by operating the stacker crane 1, the procedure starts with allowing the ram fork 28 to load the rolled load into the swivel frame 26 of the carriage 7.

The swivel drive motor 23 is then driven to rotate the pinion gear 25 and thus the inner ring 21 of the swivel bearing 20. As the inner ring 21 rotates, the swivel frame 26 is turned to 180 degrees. This action causes the ram fork 28 in the carriage 7 to turn 180 degrees so that its fork 28a is directed with the front end facing the target rack b.

This action is followed by actuation of the fork drive motor 35 on the ram fork 28 to rotate the drive gear 37b and the pinion gear 37a. As the pinion gear 37a runs directly on the rack gear 34, the ram fork 28 holding the rolled load R travels (or advances) towards the target rack b. Upon its fork 28a reaching a desired position on the rack b, the ram fork 28 stops its (advancing) movement. The lift drive unit 8 is then actuated to lower the carriage 7 briefly. After the rolled load is placed on the desired position of the rack b, the ram fork 28 is moved backward (or retracted) to remain in the swivel frame 26 of the carriage 7. The stacker crane 1 then stands by until another command signal is given.

Third Embodiment

A third embodiment of the present invention will now be described in the form of a method of controlling the fork-lift apparatus and a fork-lift controller apparatus for implementing the method.

As shown in FIGS. 11, 12, 13, 14, and 15, there are an input table 1A, an output table 2A, and a rail track 3A provided on the floor. Denoted by C1 are coils made by winding a wire material into a cylindrical shape and stored in a warehouse. The coil C1 has a center aperture C2 provided therein and its outer diameter and width are varied depending on the thickness and length of the wire material.

Also, shown are storage blocks 41 and 42 disposed on both sides of the rail track 3A and comprising a multiplicity of storage tiers 4A arranged vertically. The two storage blocks 41 and 42 on both sides of the rail track 3A form storage arrays 43. A center detecting means 11 is provided for examining a difference between the reference level L1 defined by the input table 1A and the height level of the center aperture C2 of the coil C1 and delivering it as a compensation data L2 for position of the center aperture.

An ID tag 5A is provided at the lowermost of each storage array 43. The ID tag 5A comprises a rewritable data memory means 51 and a data input/output means 52 for writing a data supplied from a fork-lift mechanism, which will be explained later, to the data memory means 51 and for reading a data from the data memory means 51 and delivering it to the fork-lift mechanism.

Each of the ID tags 5A is adapted to store data for ten racks of the storage blocks 41 and 42.

The fork-lift mechanism denoted by 6A comprises a couple of forks 61 (equivalent to the ram fork 28 of the second embodiment) provided at both, left and right, sides movable to and from the center aperture C2 of the coil C1 on the rack, a fork actuating means 62 for moving the forks 61 forward and backward, a carriage 63 (equivalent to the carriage 7 of the previous embodiment) movable vertically, a vertical actuating means 65 (equivalent to the lift apparatus 8 of the previous embodiment) for moving the carriage 63 upward and downward throughout a crane 64, a vertical movement detecting means 69 for measuring a vertical movement of the carriage 63, a cane traveling apparatus 66 (equivalent to the crane traveling apparatus 2 of the previous embodiment) movable along the rail track 3A, an ID controller 67 for transmitting and receiving data to and from the ID tags 5A, a fork controller 68 responsive to an array data from a controller apparatus, which will be described later, for controlling the movement of the crane traveling apparatus 66 and responsive to a tier data from the controller apparatus and a compensation data from the ID controller 67 for controlling the movements of the fork actuating means 62 and the vertical actuating means 65 while monitoring the vertical movement of the carriage 63, and a power receiving means for receiving an input of motive power.

The crane traveling apparatus 66 is arranged to reach a predetermined storage array as counting the number of the arrays or ID tags.

The vertical movement detecting means 69 comprises a tier detecting means 693 including detection labels 691 allocated to the tiers or racks of each storage array and reference level detector 692 for counting the detection labels 691 and upon the number of the counted labels 691 being equal to the tier data, determining its position is the reference level of a target rack 4A, a vertically extending magnetic stripe pattern 694 provided on one side of the crane 64, and a compensating movement detecting means 697 mounted on the carriage 63 for counting signal pulses given by reading the magnetic stripe pattern 694 with a magnetic sensor 695 thus to calculate a movement.

The detection labels 691 may be mounted to the crane 64. Also, the rack number detecting means 693 may be substituted by the compensating movement detecting means 697.

The controller apparatus is provided for controlling the foregoing components in a sequence of orders as denoted by 9A and comprises an input means 91 for receiving loading and unloading data, an address memory means 92 for recording a combination of storage array data and tier data of each stored coil C1 as an address data, data input/output means 93 responsive to the loading and unloading data for reading and writing of data on the address memory means 92, and a data transfer means 94 for transmitting both the array data and tier data to the fork-lift mechanism 6A.

The address memory means 92, data input/output means 93, and fork controller 68 are identical to a memory means, a read/write means, and a fork control means specified in claims 7 and 8 of this application.

Figure 17:
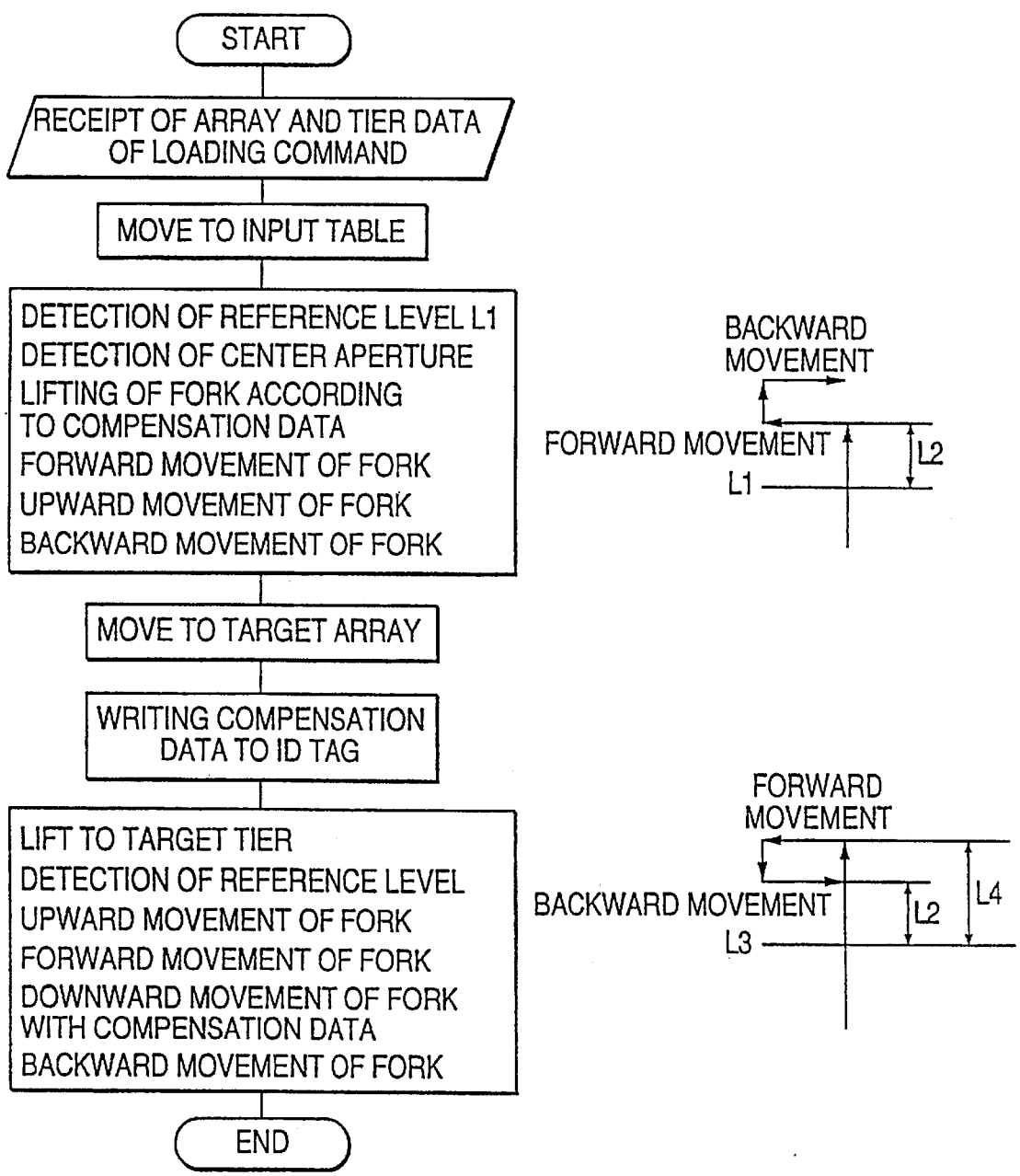
FIG. 17 is a flow chart diagram showing a sequence of loading steps of a control method used with the loading and unloading system.
Figure 18:
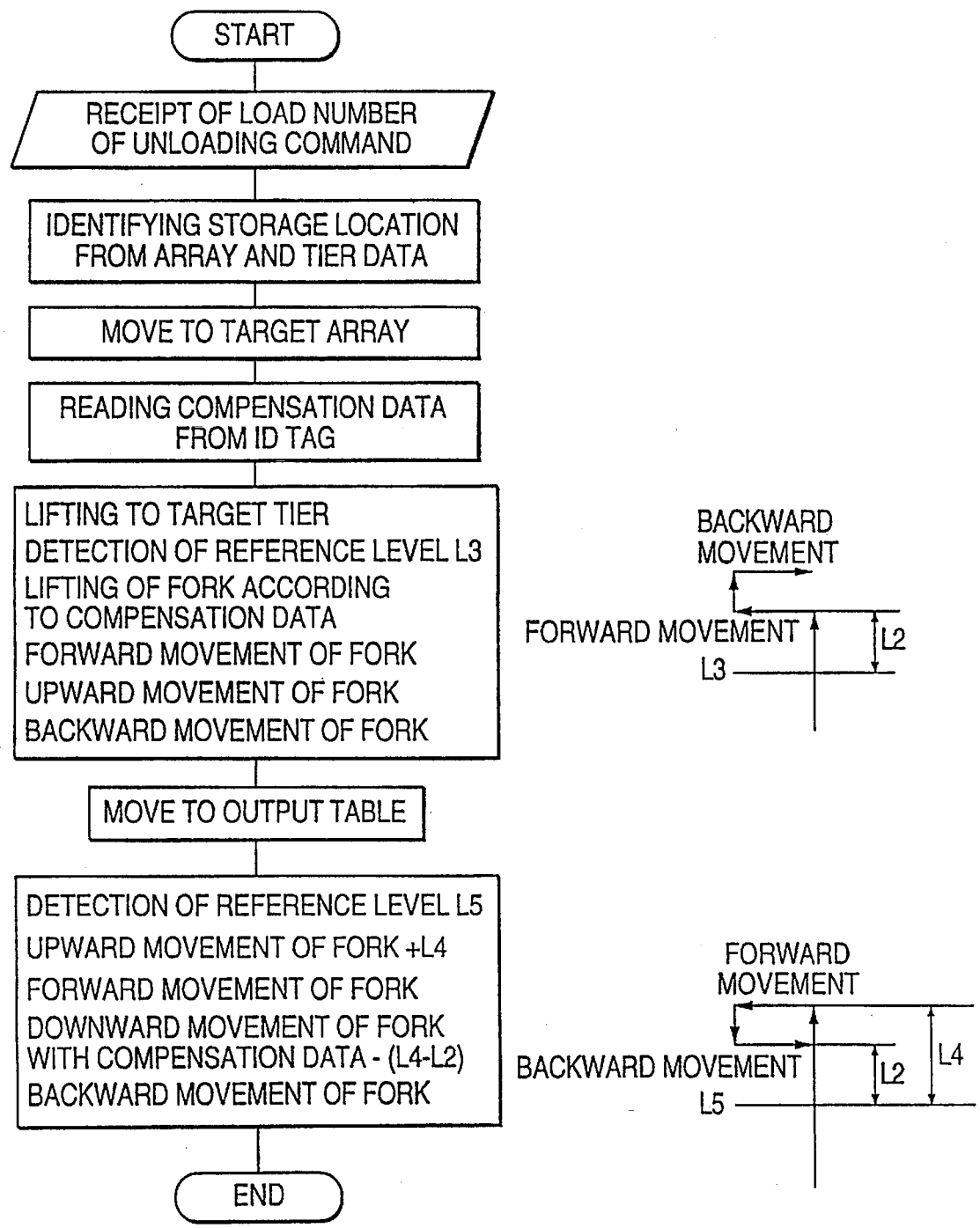
FIG. 18 is a-flow chart diagram showing a sequence of unloading steps of the control method used with the loading and unloading system.

Both a loading action and an unloading action with the above arrangement will be explained referring to FIGS. 17 and 18. The explanation starts with initial steps of the loading action for accepting a load.

When the input means 91 receives a loading command, it starts accessing the address memory means 92 for searching an unoccupied rack. Both array and tier data of the unoccupied rack are then released from the data transfer means 94. Upon receiving the two data from the data transfer means 94, the fork controller 68 stores them as a record and instructs the crane traveling apparatus 66 to travel to the input table 1A. After the reference level L1 of the input table 1A is measured, a difference between the reference level L1 and the level of the center aperture C2 of the coil C1 is calculated by the center detecting means 11 and stored as the compensation data L2.

The forks 61 are then lifted up from the reference level by a distance defined by the compensation data L2 so that one of them comes to the height of the center aperture C2 of the coil C1. The fork actuating means 62 is actuated to move the fork 61 forward for insertion into the center aperture C2 of the coil C1.

Then, the vertical actuating means 65 is driven to move the carriage 63 upwards and thus lift up the coil C1 from the input table 1A. The fork actuating means 62 is started again to move the fork 61 backward as is followed by lowering the carriage 63 to its original location with the vertical actuating means 62.

Succeeding steps of the loading action for storage of the load will now be explained.

The crane traveling apparatus 66 is actuated in response to the storage array data of the coil C1 so that it travels to a corresponding array location.

As the crane traveling apparatus 66 has arrived at the array location, the compensation data is transmitted via the ID controller 67 to the ID tag 5A of the array 43. The compensation data received by the ID tag 5A is then written by the data input/output means 51 to a corresponding address in the data memory means 52. This writing action allows previous data in the address to be deleted automatically.

The vertical actuating means 65 is driven by the tier detecting means 693 of the vertical movement detecting means 69 for lifting to the reference level L3 of the storage rack 4A of the tier defined by the tier data. The vertical actuating means 65 is then driven by the compensating movement detecting means 697 for further upward movement through a distance of L4 (>L2) so that the bottom of the coil C1 is higher than the top of the storage rack 4A. The fork actuating means 62 is driven to move the fork 61 forward and then, the fork 61 is lowered by a distance of L4−L2 so that its center comes to a position which is higher by L2 of the compensation data than the reference level L3.

As the result, the coil C1 is placed directly on the storage rack 4A as released from the fork 61.

The fork actuating means 62 is driven to move the fork 61 backward and then, the vertical actuating means 65 is driven for downward movement to the original height position. During the loading action, the major vertical movement or tier accessing movement of the vertical actuating means 65 is controlled by a signal of the tier detecting means 693 while the minor vertical movement or L4 and L2 associated movement at the target tier of the same is controlled by a signal of the compensating movement detecting means 697. The loading action is now completed.

The unloading action will be explained starting with steps of removal of a load.

When the input means 91 receives an unloading command, it starts accessing the address memory means 92 to identify the storage rack 4A where a target coil C1 is stored. The storage array data and tier data of the rack 4A are transmitted by the data transfer means 94 to the fork controller 68 of the fork-lift mechanism 6A.

Then, the crane traveling apparatus 66 is actuated according to the array data for traveling to the storage array 43 of the coil C1.

When the crane traveling apparatus 66 has arrived at the array location, the compensation data L2 for the coil C1 stored in a corresponding address of the data memory means 51 in the ID tag 5A of the array 43 is read out by the ID controller 67 in cooperation with the data input/output means 52.

The vertical actuating means 65 is driven in response to the tier data for upward movement to the reference level L3 of the storage rack 4A. The vertical actuating means 65 is further moved upward by L2 of the compensation data so that the fork 61 comes to the center aperture C2 of the coil C1. The fork actuating means 62 is then driven to move the fork 61 forward for insertion into the center aperture C2 of the coil C1.

After the upward movement is briefly repeated to lift up the coil C1 from the storage rack 4A, the fork actuating means 62 is driven to move the fork 61 backward as is followed by the lowering movement with the vertical actuating means 65 to the original position.

Steps of the unloading action for releasing the load will now be explained.

The crane traveling apparatus 66 is driven for traveling to the output table 2A. The vertical actuating means 65 is then driven for upward movement to the reference level L5 of the output table 2A. After a further upward movement of L4 (>L2) for lifting up the coil C1 so that its bottom is higher than the top of the output table 2A, the fork actuating means 62 is driven to move the fork 61 forward. Then, the fork 61 is lowered by L4–L2 so that it comes to a location higher by L2 of the compensation data from the reference level L5. As the result, the coil C1 is placed directly on the output table 2A as released from the fork 61. The fork actuating means 62 is driven again to move the fork 61 backward and the vertical actuating means 65 is driven for downward movement to the original position.

The unloading action is now completed.

It is desirable that the input table 1A, the storage rack 4A, and the output table 2A are identical to each other in the compensation data of L2 which extends from their surface to the center line of the center aperture C2 of the coil C1. In case that the compensation data L2 is not identical, it can easily be corrected by adjusting the components of the fork-lift mechanism.

The center detecting means 11 may employ distance sensors assembled in the following arrangement.

More specifically, the center detecting means 11 comprises an upper distance sensor 111 distanced upwardly by H1 from the reference level L1 of the input table 1A for detecting a distance from the top of the coil C1, a lower distance sensor 112 distanced downwardly by H2 from the reference level L1 of the input table 1A for detecting a distance from the bottom of the coil C1, a scanning means 113 for scanning with both the distance sensors 111 and 112, and a transducer circuit 114 for calculating and delivering the compensation data L2. In action, the distance H3 between the upper distance sensor 111 and the top of the coil C1 is measured by scanning the top of the coil C1 placed on the input table 1A and the distance H4 between the lower distance sensor 112 and the bottom of the coil C1 is measured by scanning the bottom of the same.

The scanning means 113 and transducer circuit 114 are identical to a traveling means and a transducer means defined in claim 7 of this application.

Using the four measurements H1, H2, H3,and H4, the compensation data L2 which represents a distance of the center line of the center aperture C2 from the reference level L1 is calculated from Equation 1 as expressed below.

$$L2 = \frac{(H2-H4)+(H1-H3)}{2} + (H4-H2)$$
$$= \frac{H4-H3+H1-H2}{2}$$

In the above arrangement, the distance sensors are disposed above and beneath the coil C1. However, the distance sensors may be arranged at both, left and right, sides of the coil C1 with equal success for measuring horizontal distances to the center line of the center aperture C2 by scanning.

Figure 14:
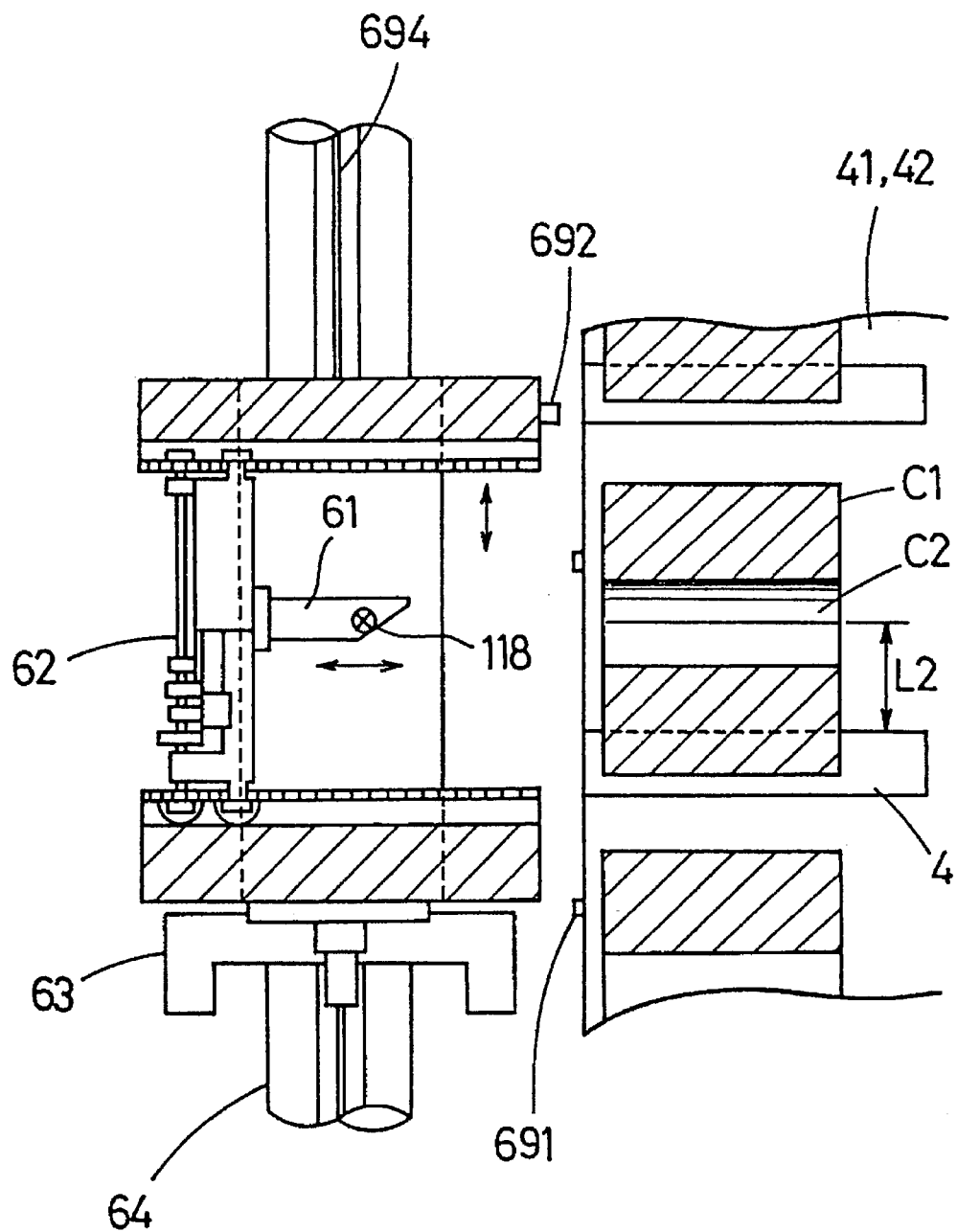
FIG. 14 is an explanatory view of a primary part of a crane mechanism in the loading and unloading system.
Figure 15:
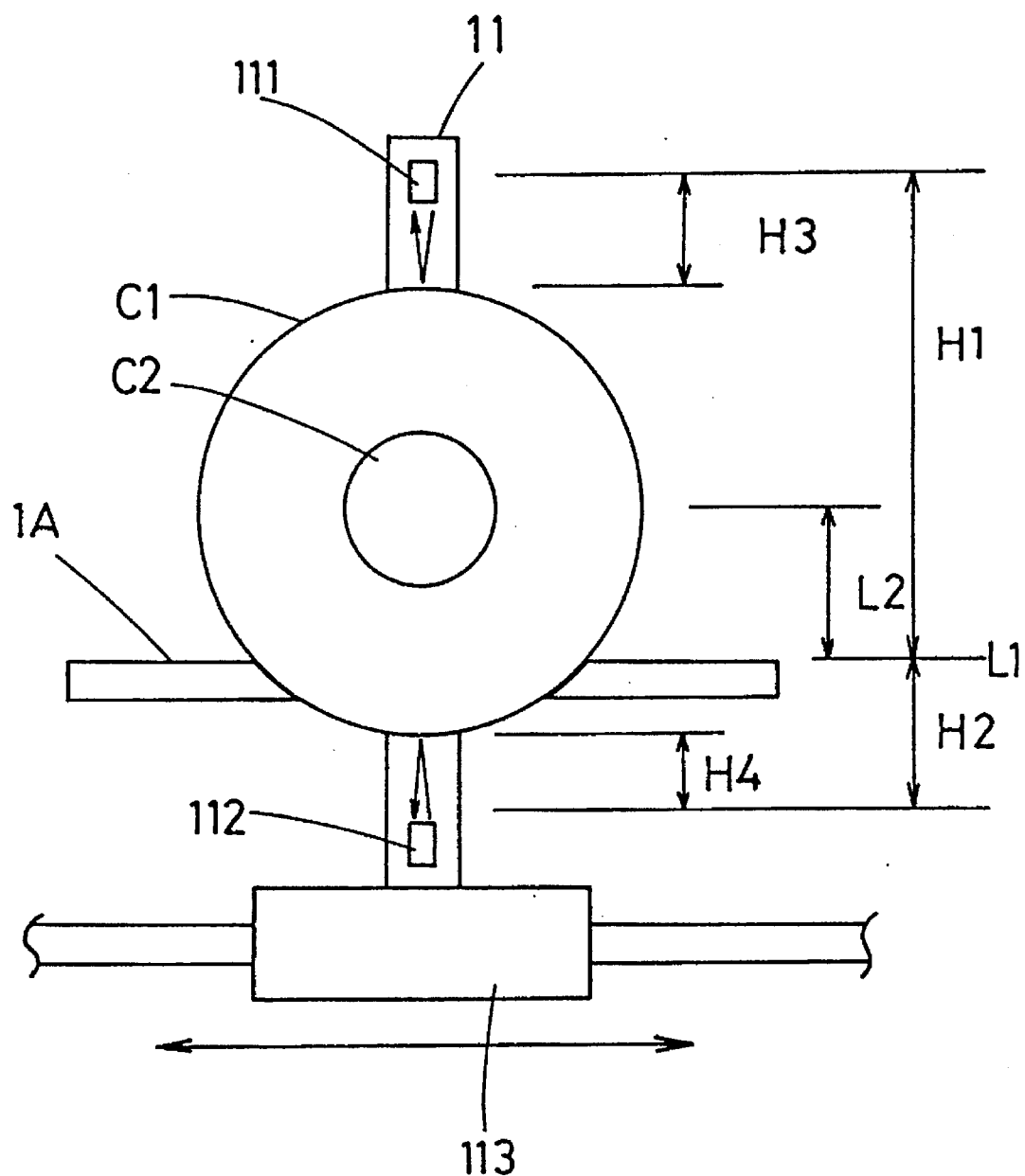
FIG. 15 is an explanatory view of a primary part of a center detecting means mounted on an input table of the loading and unloading system.

Also, the distance sensors may be substituted by a combination of the compensating movement detecting means 697, the vertical actuating means 65, and a photoelectric switch 118 mounted on the fork 61 as shown in FIG. 14.

In this case, the further upward movement of the carriage is executed after the reference level is measured by a reference level detecting means.

Hence, the vertical actuating means 65 and compensation movement detecting means 697 correspond to a traveling means and a transducer means defined in claim 8.

This movement is followed by examining with the photoelectric switch 118 whether or not there is a reflective object in the front of the fork 61 and counting pulses of the magnetic sensor.

Figure 16:
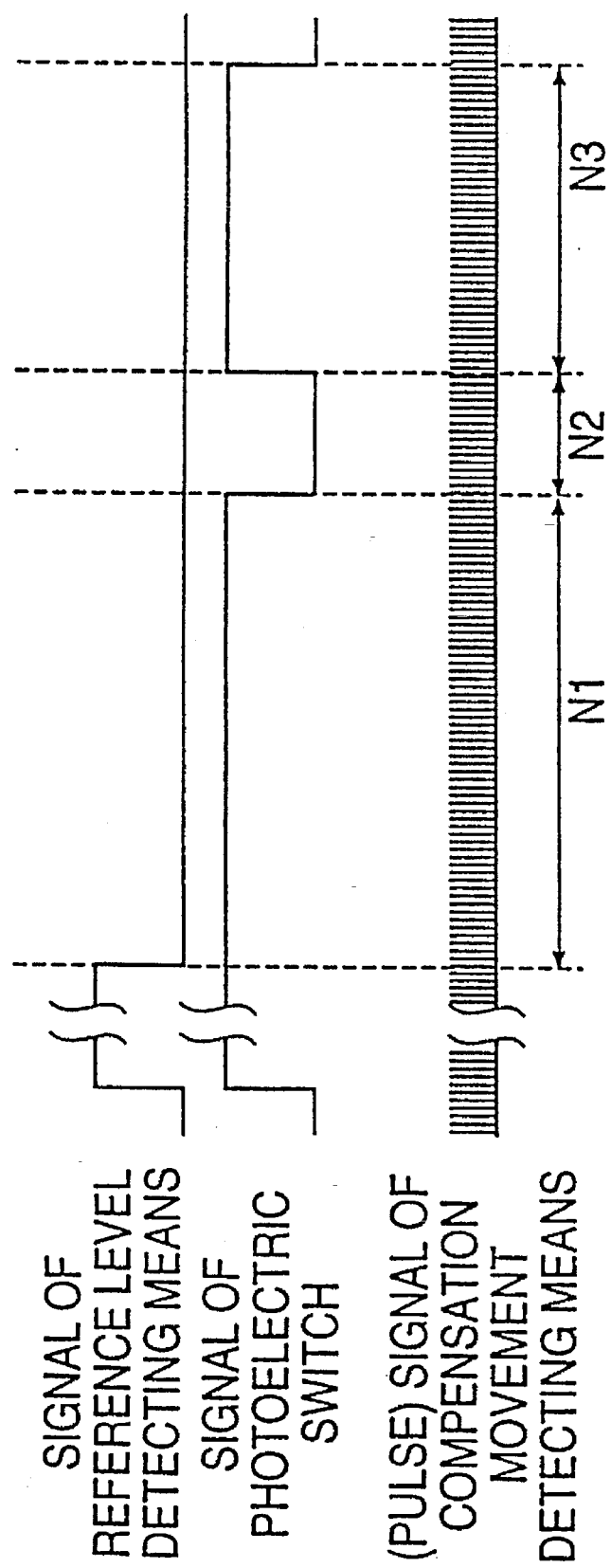
FIG. 16 is a timing chart diagram explaining the action of another center detecting means.

As shown in FIG. 16, an N1 number of pulses are counted until the fork 61 reaches the center aperture C2 of the coil C1, N2 pulses are counted during scanning of the center aperture C2 before a reflected light is detected, and N3 pulses are counted until it reaches the top of the coil C1 where the reflected light is no more detected. Using the pulse numbers N1, N2, and N3, and a rate of resolution (K mm/pulse) of the magnetic sensor, the compensation data L2 which represents a distance of the center line of the center aperture C2 of the coil C1 from the reference level L1 is then calculated from Equation 2 as expressed below.

$$L2 = K \cdot \left( N1 + \frac{N2}{2} \right)$$

It is understood that the two above examples of the center detecting means 11 are illustrative but not of limitation.

More preferably, two or more of the center detecting means 11 may be provided for a fail-safe function where one is applicable when the other is defective or out of order.

It is desirable for optimum action of the fork-lift mechanism 6A to verify at an initial stage that the carriage remains at the original level, that the fork 61 stays at its retracted state, and that no coil C1 is held in the fork-lift mechanism 6A, and to examine whether or not the coil is placed on the input or output table.

According to the embodiment of the present invention, a distance data of the center aperture C2 of the coil C1 from the upper surface of the input table is measured and recorded at the loading action. It can be retrieved and used for identifying the height level of the coil C1 during the unloading action without being measured again. Accordingly, the unloading of the coil C1 will readily be implemented while any collision of the fork against the coil C1 being avoided.

For the purpose, there are provided only the means for measuring and recording the location of the center aperture C2 of the coil C1 at the loading action.

In the embodiment, the center aperture of a load is measured at the initial stage of the loading action as is not informed. If any appropriate data, e.g. a radius, which is used as a compensation data at the receiving step is given together with the ID number of the load for ease of handling, the center detecting means 11 may be eliminated.

FEASIBILITY FOR INDUSTRIAL APPLICATIONS

As set forth above, the present invention allows any load of a rolled form to be smoothly loaded to or unloaded from a desired tier of a multi-tier automatic warehouse by controlling the traveling movement of the stacker crane, the lifting and lowering movements of the carriage, and the forward and backward movements of the ram fork.

The ram fork is arranged for movements forward and backward in a swivel frame on the carriage by means of rack and pinion gears, carrying the rolled load to and from the swivel frame for storage on a desired rack without using an extensive length of the fork member. Also, the carriage contains a swiveling means for turning the ram fork in the swivel frame through 180 degrees, thus allowing the rolled load to be easily transferred from one to the other of the two tier blocks disposed on both sides of a track of the stacker crane. Also, the load on the stacker crane can be loaded to and unloaded from any rack of either of the left and right blocks.

As no pallet is required, its thickness and a margin for the fork are disregarded. This allows the amount of storage to be increased and the available space in a warehouse to be utilized at optimum. During the handling, there is no time for loading a load to a pallet and the overall procedure will be shortened thus decreasing the cost.

According to the present invention, the center of swivel movement is at the center of the carriage, i.e. the swivel frame rotates about its gravity center. This allows the effect of inertia force to be minimized. Hence, the speed of swivel movement will be increased and the cycle time for loading and unloading of loads will be decreased.

The ram fork in the swivel frame is movably supported by the cable wires which extend from the lower end of the fork side of the ram fork to the upper end of the counter fork side of the same via the rotary member pivoted on specified regions of the swivel frame. This allows any stress exerted on the ram fork when a load is carried to be offset, thus ensuring constant stable movements of the ram fork.

According to the control method of the present invention, the movement of the fork is controlled by a location data of the center aperture of a load which is to be carried. Hence, the load will readily be carried to and from a warehouse without being monitored by the operator nor having any possibility of colliding with the fork. The handling of the loads will thus increased in the operational reliability and efficiency.

For implementing the above method, the control apparatus of the present invention includes a memory means for recording the location data of the center aperture of each load, a retrieving means for reading the recorded location data, and a fork controlling means for controlling the movement of the fork with the location data.

In case of a load to be loaded is formed of a cylindrical shape having a center aperture therein into which the fork is inserted for carrying, the location of its center aperture is measured and recorded at the beginning of loading. For unloading of the load, the location of its center aperture is retrieved and used for controlling the movement of the fork. Accordingly, the control apparatus like the control method will be enhanced in the operational reliability and efficiency.

As the location of the center aperture of a load is simply measured by scanning with a distance sensor over the periphery of the load, the foregoing function of the control apparatus will be performed with ease and certainty.

The control apparatus may be implemented in which the center aperture location is measured by moving a photoelectric switch for detecting the presence or absence of reflected light.

With the use of a combination of the above devices, the control apparatus will be further increased in the operational reliability.

As described, the control method and apparatus according to the present invention allow the fork to be inserted into the center aperture of a load readily and accurately for loading to and unloading from a warehouse.

We claim:

1. A fork-lift apparatus in a stacker crane for carrying a load to and from a desired tier for storage in a multi-tier automatic warehouse, having a crane running apparatus for traveling forward and backward and a carriage arranged to support the fork-lift apparatus and driven by a lift apparatus for upward and downward movements, characterized in that the carriage has at its lower region a horizontal swivel device, a swivel frame mounted over the horizontal swivel device and made of an assembly of upper, lower, front and rear members which is open to both, left and right, sides of a track of the stacker crane and has an inner space for accepting the load, a couple of rack gears mounted to the upper and lower members of the swivel frame respectively and extending lengthwisely of the swivel frame, and a ram fork mounted between left and right ends in the swivel frame and comprising a main body extending between the upper and lower members of the swivel frame, a fork extending from a central region of the main body, and a plurality of pinion gears mounted to the upper and lower ends of the main body for meshing with both sides of the upper and lower rack gears and synchronously driven by a drive means mounted on the main body so that the ram fork can travel throughout the swivel frame when the synchronous rotating movement of the pinion gears meshing with the rack gears is executed by the drive means and simultaneously, it can be turned together with the swivel frame in the carriage by the action of the horizontal swivel device.

2. A fork-lift apparatus in a stacker crane for carrying a load to and from a desired tier for storage in a multi-tier automatic warehouse; having a crane running apparatus for traveling forward and backward and a carriage arranged to support the fork-lift apparatus and driven by a lift device for upward and downward movements, characterized in that the carriage has at is lower region a horizontal swivel device, a swivel frame mounted over the horizontal swivel device and made of an assembly of upper, lower, front, and rear members which is open to both, left and right, sides of a track of the stacker crane and has an inner space for accepting the load, a rack gear mounted to the lower member of the swivel frame and extending lengthwisely of the swivel frame, and a ram fork mounted between left and right ends in the swivel frame and comprising a main body extending between the upper and lower members of the swivel frame and a fork extending from a central region of the main body, and wires mounted over rotary members, rotatably mounted to both, front and rear, ends of the lower member and a rear end of the upper member of the swivel frame, for joining the lower of a fork side of the main body of the ram fork to the upper of a counter fork side of the same so that the ram fork can travel throughout the swivel frame when the rotating movement of pinion gears mounted to the main body of the ram fork and meshed with the rack gear on the lower member of the swivel frame is executed by a drive means and simultaneously, it can be turned together with the swivel frame in the carriage by the action of the horizontal swivel device.

3. A fork-lift controlling apparatus for use with a system having an input table for receiving a variety of roll-formed loads which are different in size and have axially extending center apertures therein into which a fork is inserted for handling, storage racks for storage of the loads, an output table for removal of the loads, and a fork-lift mechanism for transferring the loads between the input table, the storage racks, and the output table, characterized by a center detecting means for measuring the location of the center aperture of each load placed on the input table, a memory means for storage of the location of the center aperture of the load, a read-write means for reading and writing the location of the center aperture of the load on the memory means, and a fork controlling means for controlling the movement of the fork in accordance with the location of the center aperture of the load so that the fork is correctly inserted into the center aperture of the load, the center detecting means comprising a couple of distance sensors provided to sandwich the load for measuring a distance to the periphery of the load, a traveling means for moving the distance sensors about the cross section of the load, and a transducer means for calculating the location of the center aperture of the load from signal outputs of the distance sensors and movements of the same.

4. A fork-lift controlling apparatus for use with a system having an input table for receiving a variety of roll-formed loads which are different in size and have axially extending center apertures therein into which a fork is inserted for handling, storage racks for storage of the loads, an output table for removal of the loads, and a fork-lift mechanism for transferring the loads between the input table, the storage racks and the output table, characterized by a center detecting means for measuring the location of the center aperture of each load placed on the input table, a memory means for storage of the location of the center aperture of the load, a read/write means for reading and writing the location of the center aperture of the load on the memory means, and a fork controlling means for controlling the movement of the fork in accordance with the location of the center aperture of the load so that the fork is correctly inserted into the center aperture of the load, the center detecting means comprising a photoelectric switch mounted on the fork for detecting the presence and absence of reflected light from front, a traveling means for moving the fork in a direction parallel to the diameter of the load, and a transducer means for calculating the location of the center aperture of the load from a signal output and a movement of the photoelectric switch.

* * * * *